United States Patent
Kim et al.

(10) Patent No.: US 12,081,297 B2
(45) Date of Patent: Sep. 3, 2024

(54) METHOD FOR TRANSMITTING OR RECEIVING CHANNEL STATE INFORMATION FOR PLURALITY OF BASE STATIONS IN WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 710 days.

(21) Appl. No.: 17/266,563

(22) PCT Filed: Aug. 8, 2019

(86) PCT No.: PCT/KR2019/009971
§ 371 (c)(1),
(2) Date: Feb. 5, 2021

(87) PCT Pub. No.: WO2020/032621
PCT Pub. Date: Feb. 13, 2020

(65) Prior Publication Data
US 2021/0297135 A1    Sep. 23, 2021

(30) Foreign Application Priority Data

Aug. 8, 2018  (KR) .................. 10-2018-0092574
Sep. 21, 2018 (KR) .................. 10-2018-0114465
Jan. 11, 2019 (KR) .................. 10-2019-0004196

(51) Int. Cl.
*H04B 7/06* (2006.01)
*H04B 17/336* (2015.01)

(52) U.S. Cl.
CPC ......... *H04B 7/0626* (2013.01); *H04B 7/0617* (2013.01); *H04B 7/0632* (2013.01); *H04B 7/0639* (2013.01); *H04B 17/336* (2015.01)

(58) Field of Classification Search
None
See application file for complete search history.

(56) References Cited

U.S. PATENT DOCUMENTS 10,200,168 B2 *  2/2019  Liu .................. H04L 5/0048
10,700,747 B2 *  6/2020  Choi ................. H04B 7/04
(Continued)

FOREIGN PATENT DOCUMENTS

| KR | 1020150035555 | 4/2015 |
|---|---|---|
| WO | 2016153163 | 9/2016 |
| WO | 2018026241 | 2/2018 |

OTHER PUBLICATIONS

Qualcomm Incorporated, "Maintenance for CSI Measurement," 3GPP TSG-RAN WG1 #93, R1-1807339, May 2018, 9 pages.
(Continued)

*Primary Examiner* — Eunsook Choi
(74) *Attorney, Agent, or Firm* — LEE, HONG, DEGERMAN, KANG & WAIMEY

(57) ABSTRACT

The present disclosure relates to a method for reporting CSI by a terminal (user equipment) supported by a plurality of base stations in a wireless communication system, the method comprising: receiving CSI report-related configuration information from at least one base station among the plurality of base stations; receiving a first reference signal via a specific reception beam from a first base station among the plurality of base stations; receiving a second reference signal via the specific reception beam from at least one base
(Continued)

station except for the first base station among the plurality of base stations; calculating the CSI by performing measurement on the first reference signal and the second reference signal; and transmitting the CSI to the first base station, wherein the terminal may calculate the CSI by measuring, as interference, the second reference signal received via the specific reception beam.

16 Claims, 16 Drawing Sheets

(56) References Cited

U.S. PATENT DOCUMENTS

| | | | |
|---|---|---|---|
| 11,581,930 B2* | 2/2023 | Faxér | H04L 5/0092 |
| 11,689,328 B2* | 6/2023 | Liu | H04L 25/03 |
| | | | 370/329 |
| 2012/0033571 A1* | 2/2012 | Shimezawa | H04J 11/0053 |
| | | | 370/252 |
| 2018/0076873 A1 | 3/2018 | Xiao et al. | |
| 2020/0137750 A1* | 4/2020 | Song | H04W 72/23 |
| 2020/0395989 A1* | 12/2020 | Faxér | H04L 5/0048 |

OTHER PUBLICATIONS

PCT International Application No. PCT/KR2019/009971, International Search Report dated Dec. 4, 2019, 6 pages.

* cited by examiner

【FIG. 1】
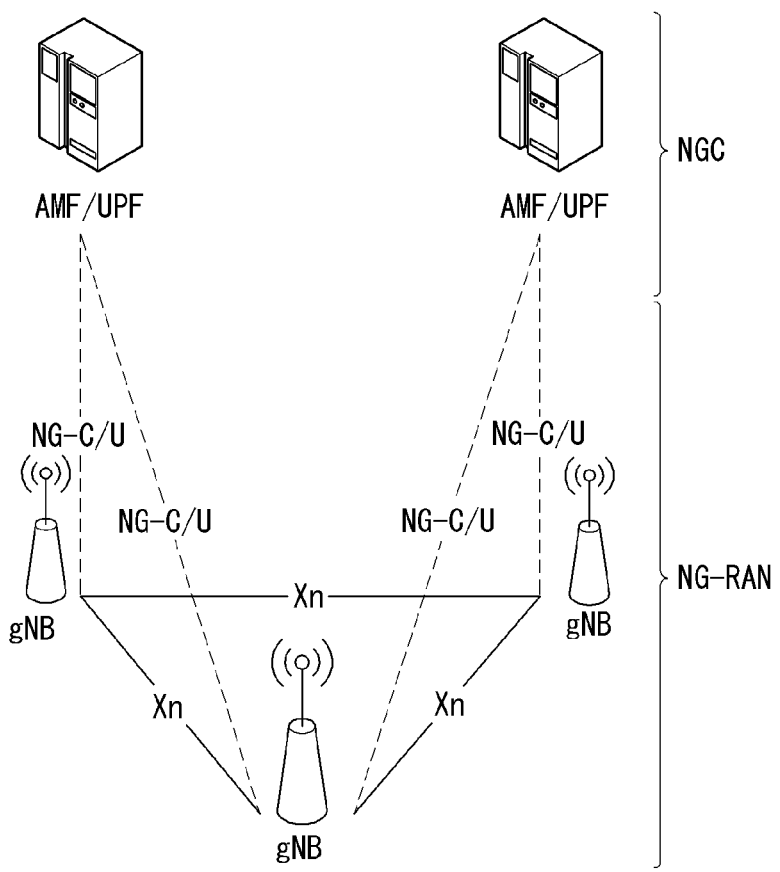
【FIG. 2】
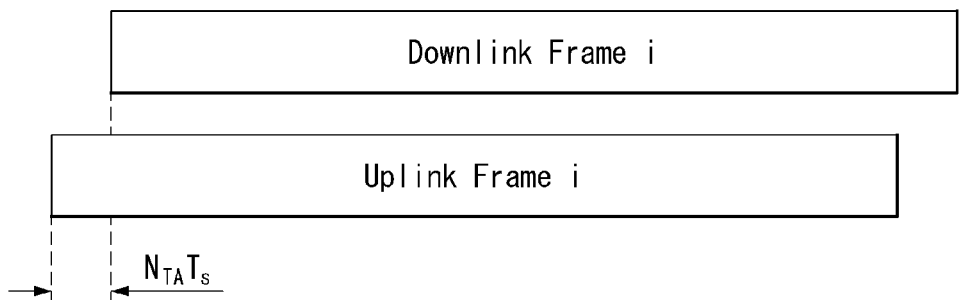

[FIG. 3]
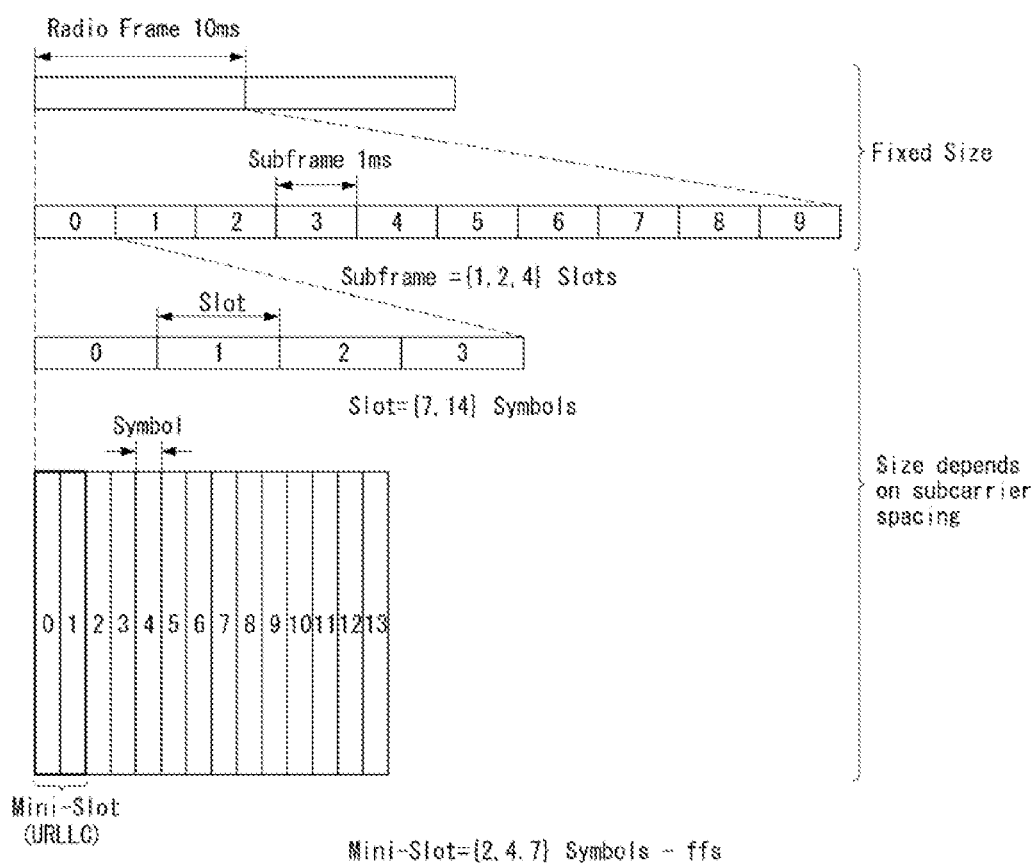

[FIG. 4]
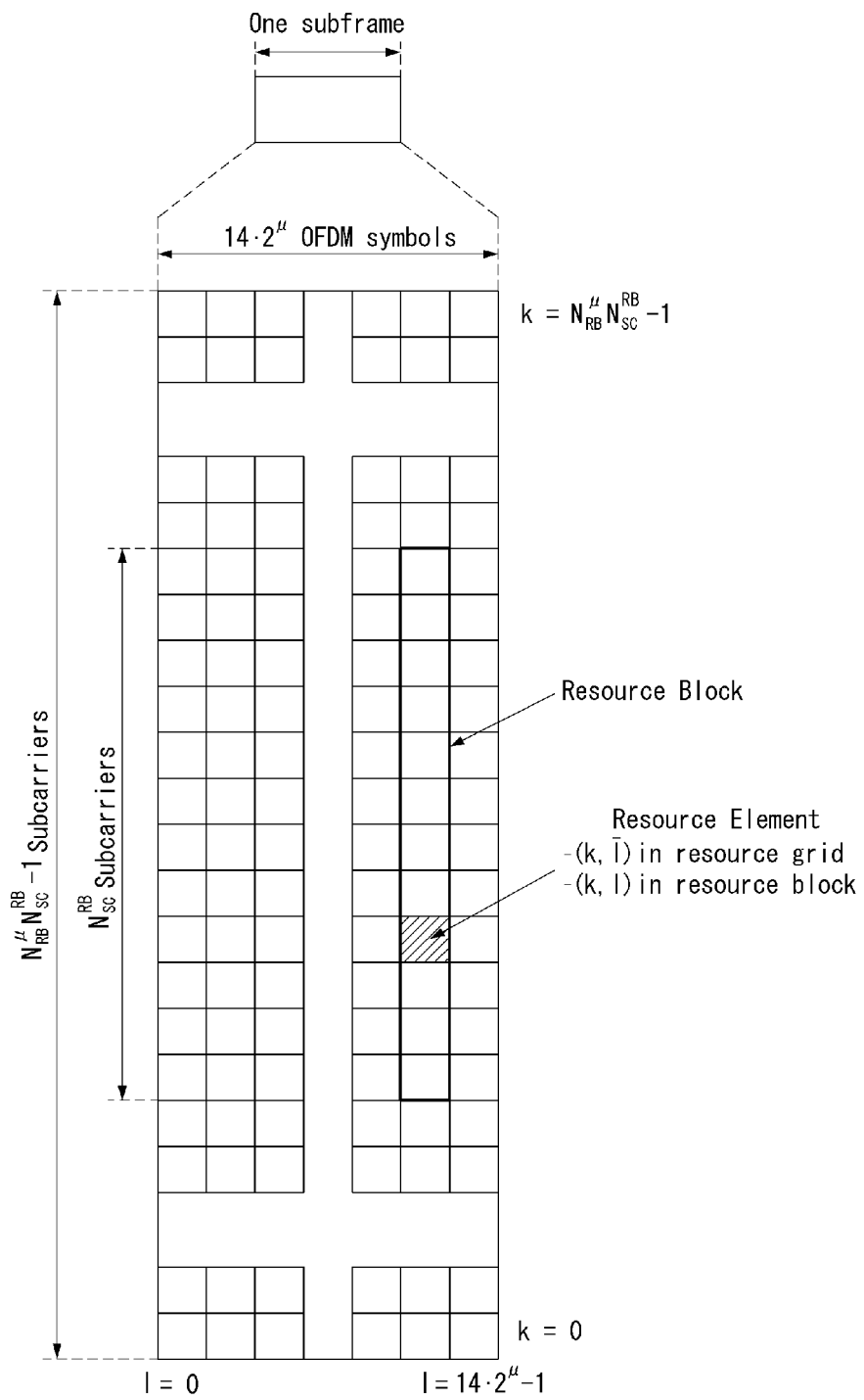

【FIG. 5】
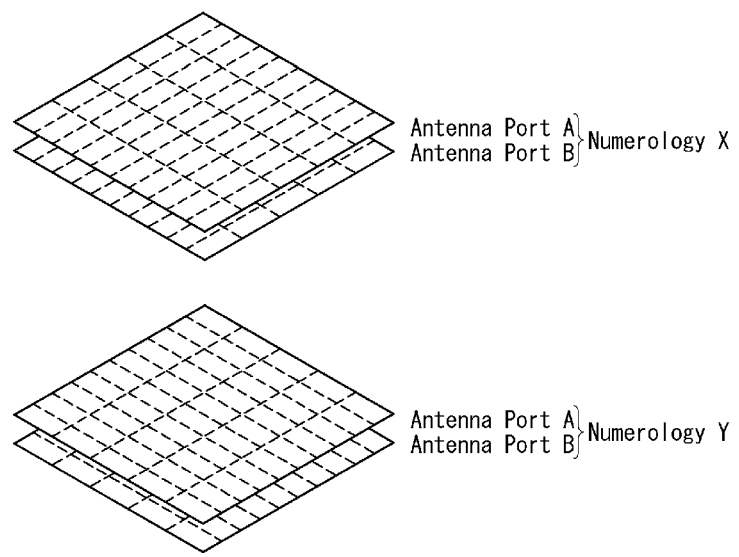
【FIG. 6】
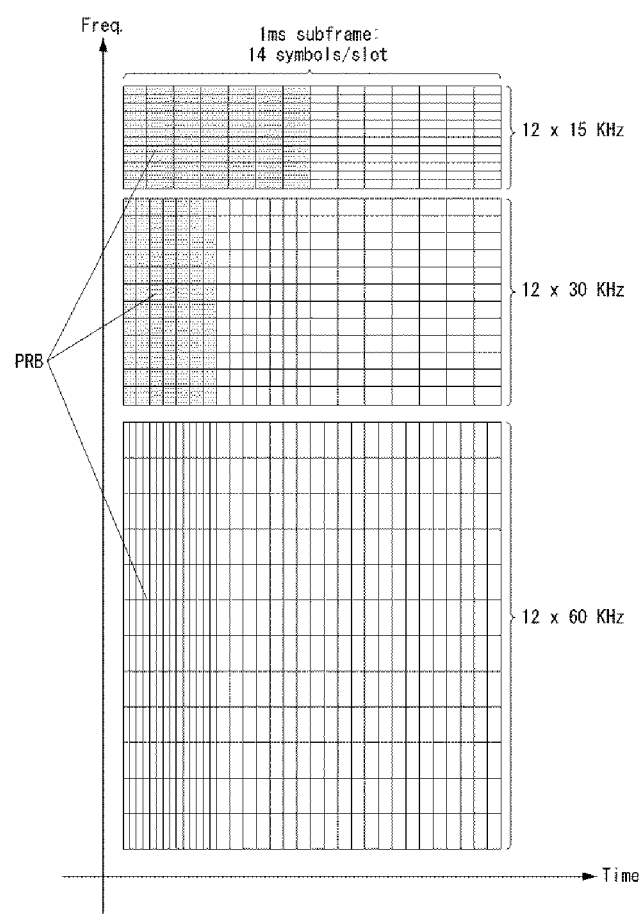

[Fig. 7]
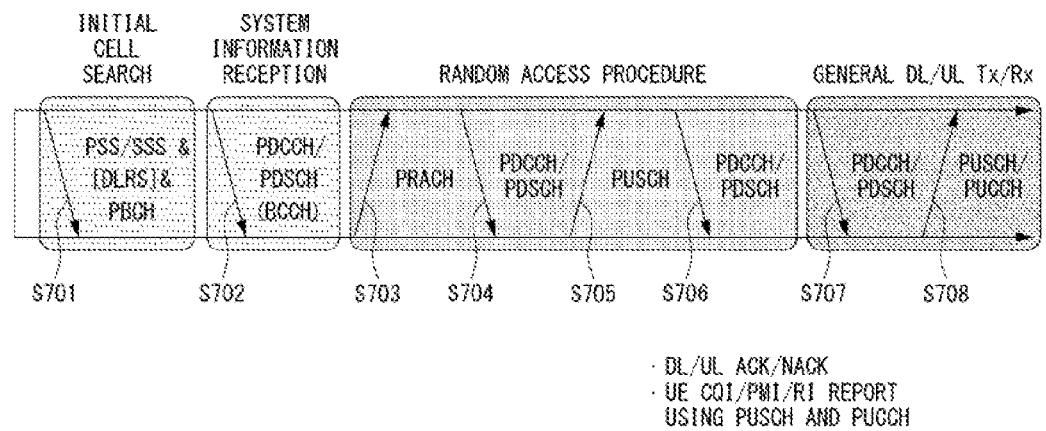
[Fig. 8]
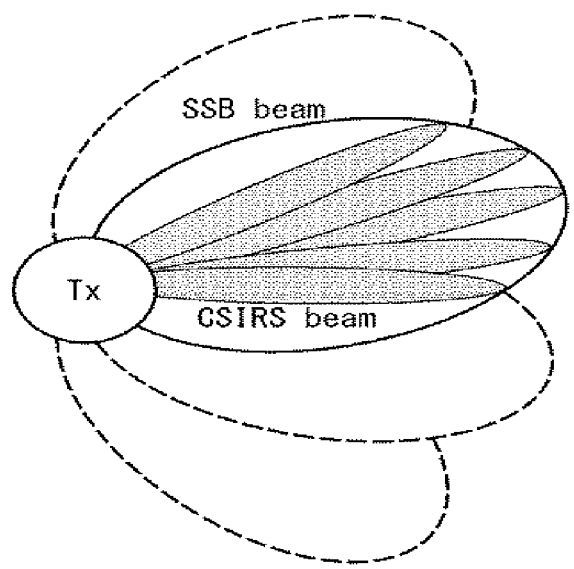

[Fig. 9]
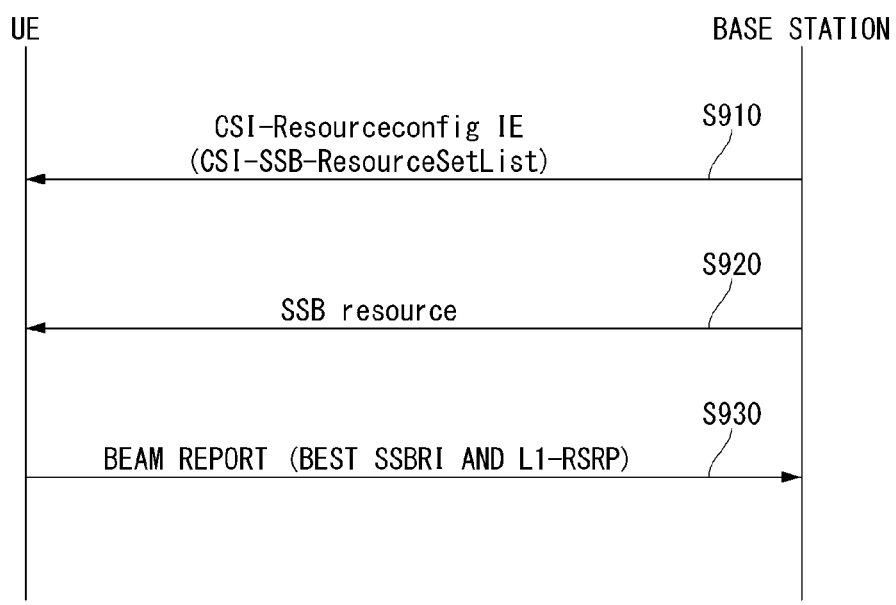

【Fig. 10】
(a) 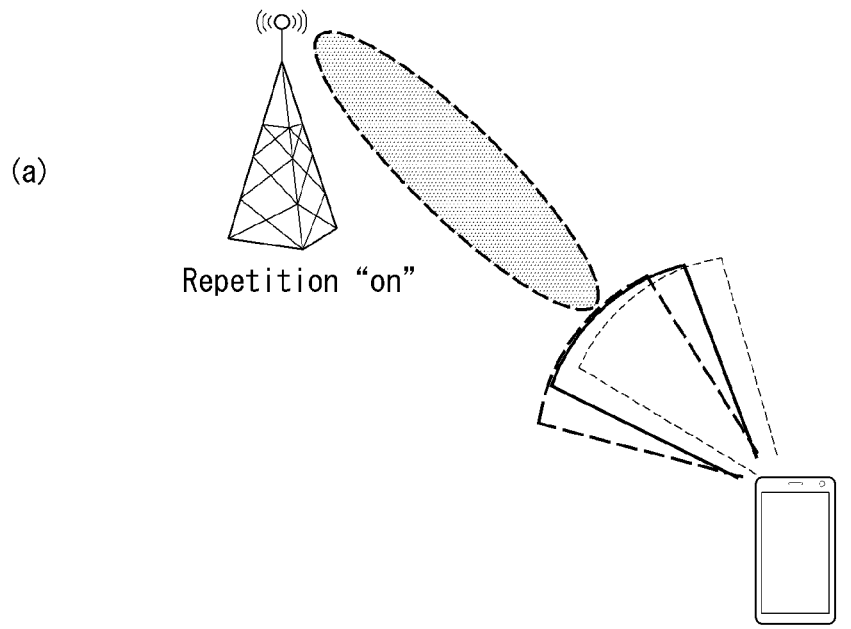
(b) 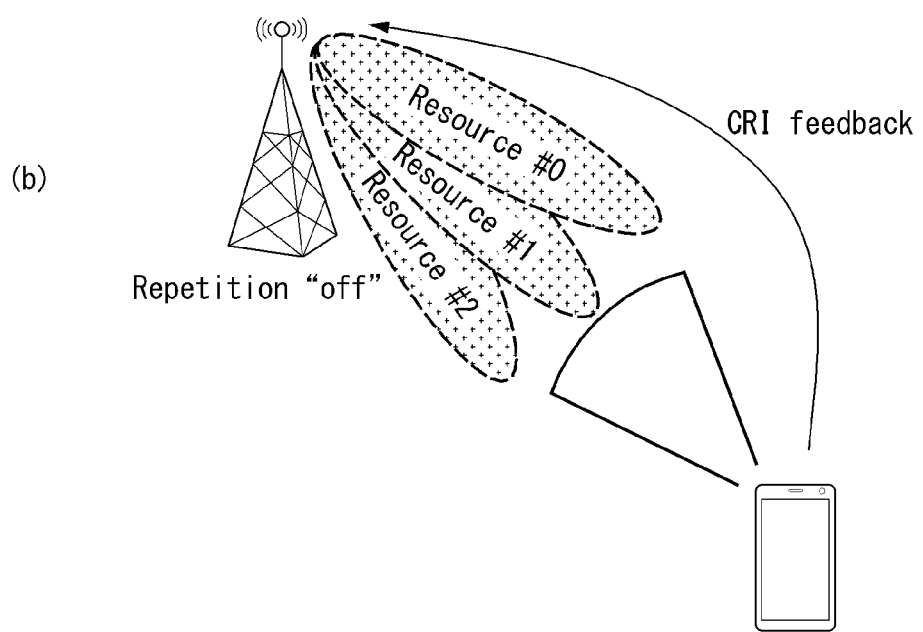

【Fig. 11】
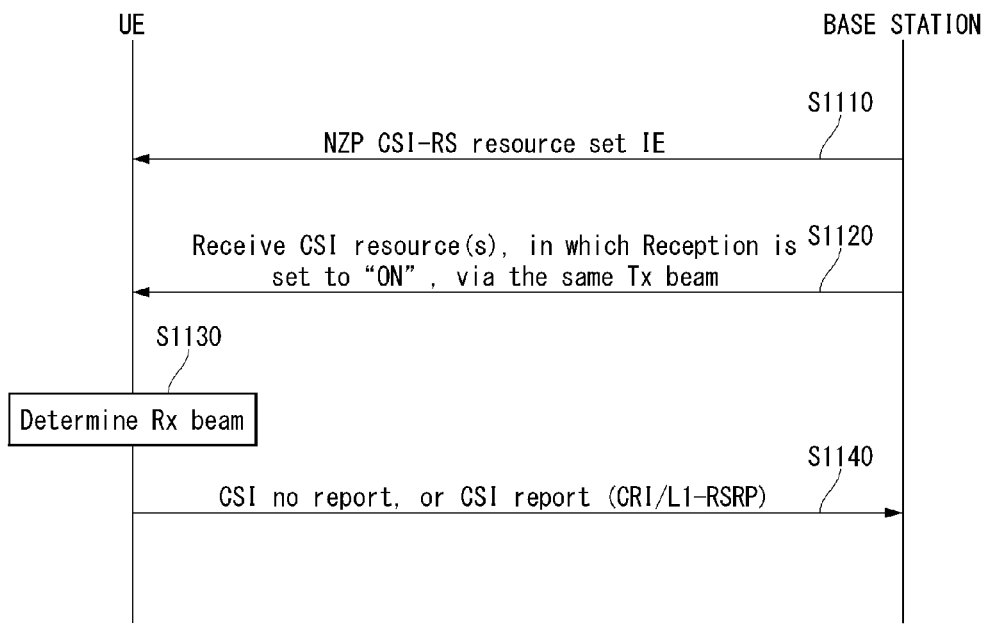
【Fig. 12】
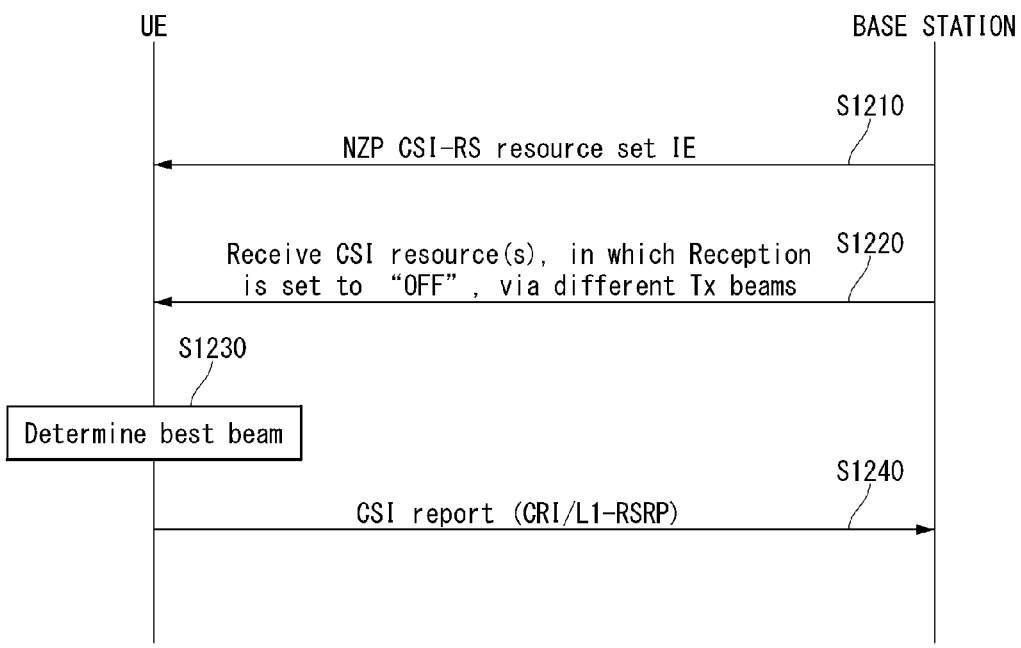

[Fig. 13]
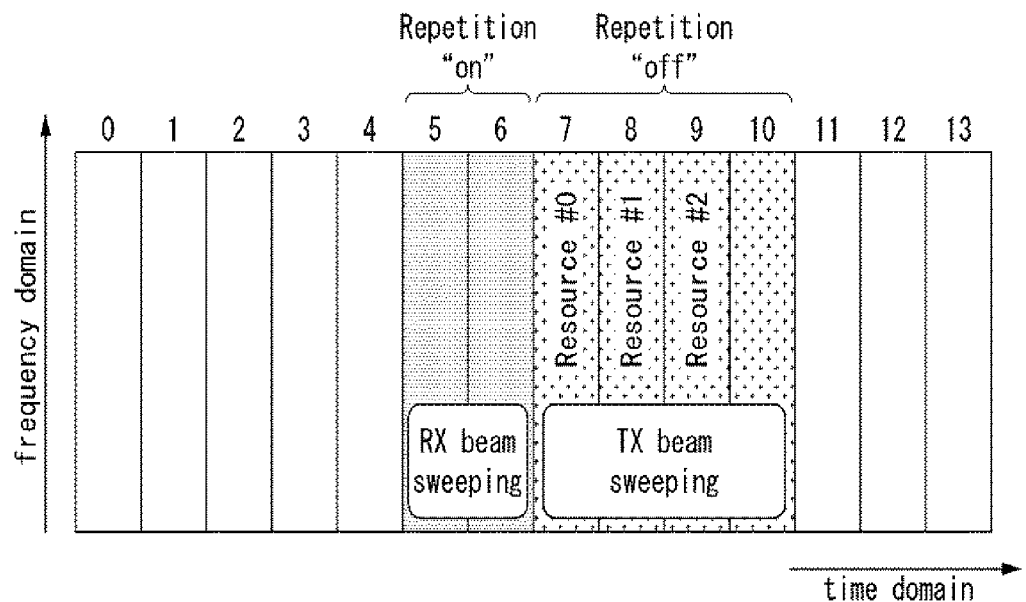
[Fig. 14]
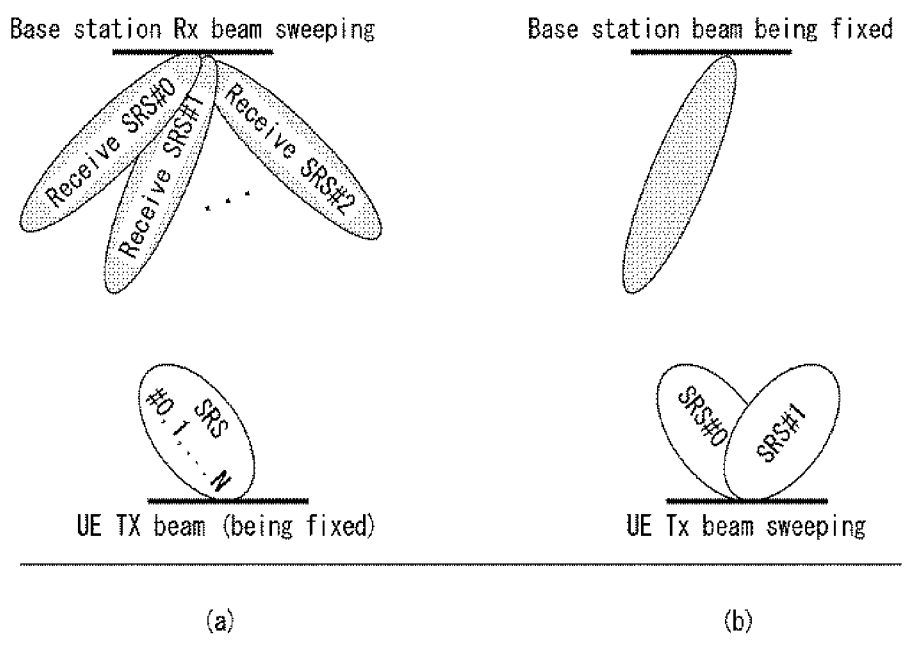
(a)            (b)

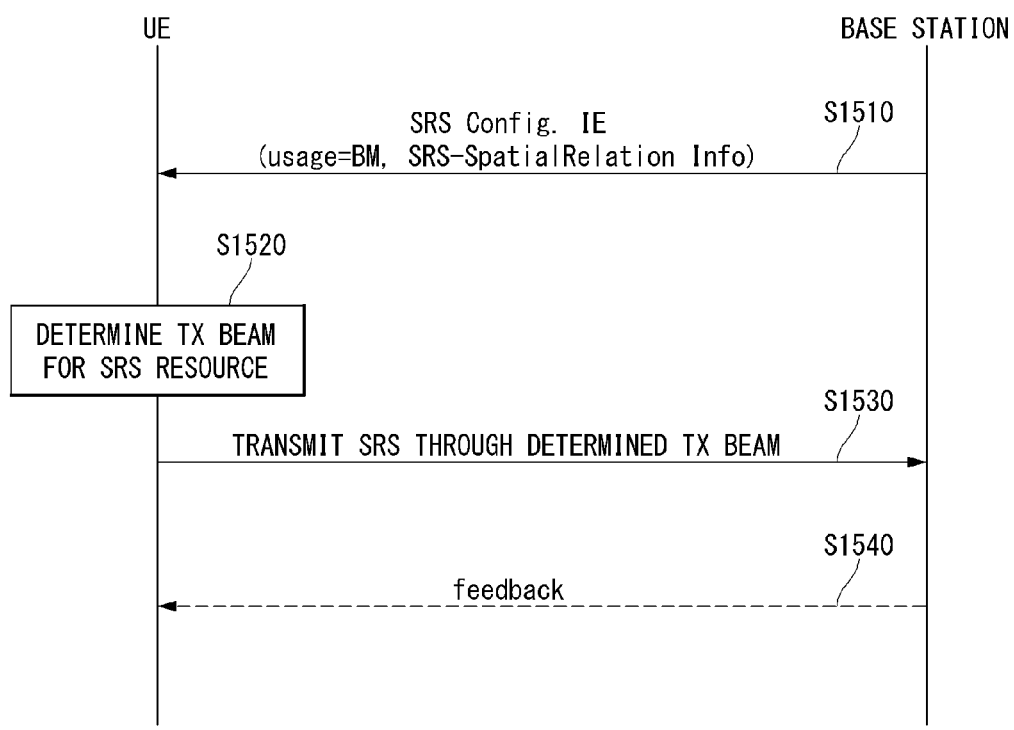
[Fig. 15]

[Fig. 16]
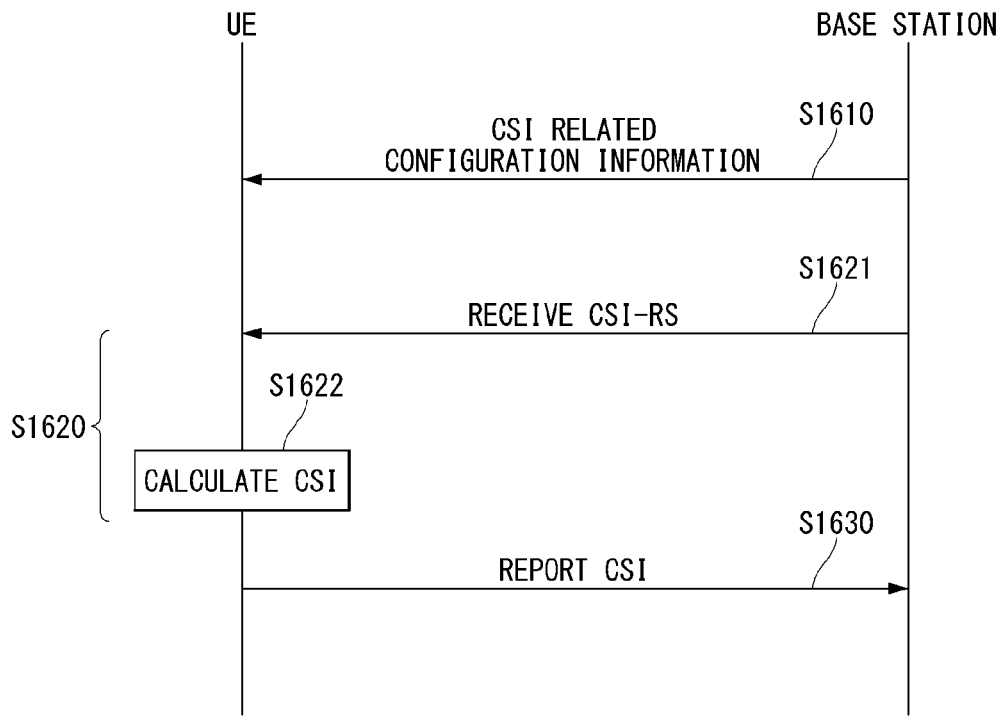
[Fig. 17]
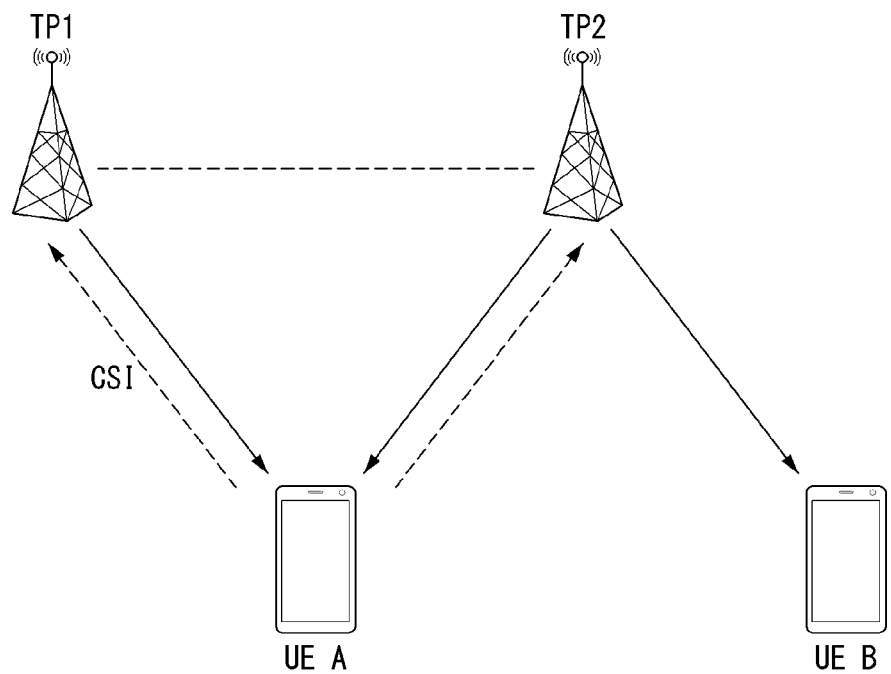

[Fig. 18]
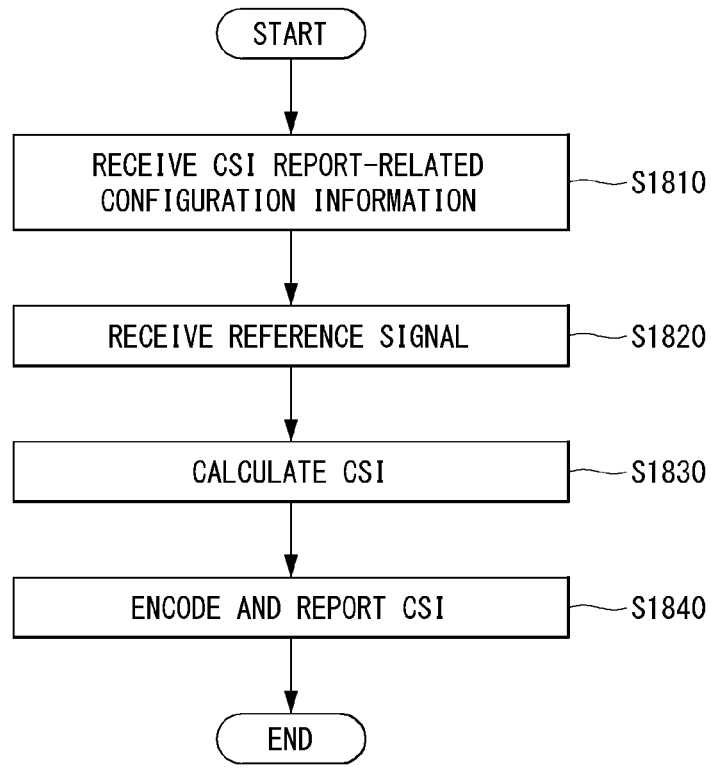
[Fig. 19]
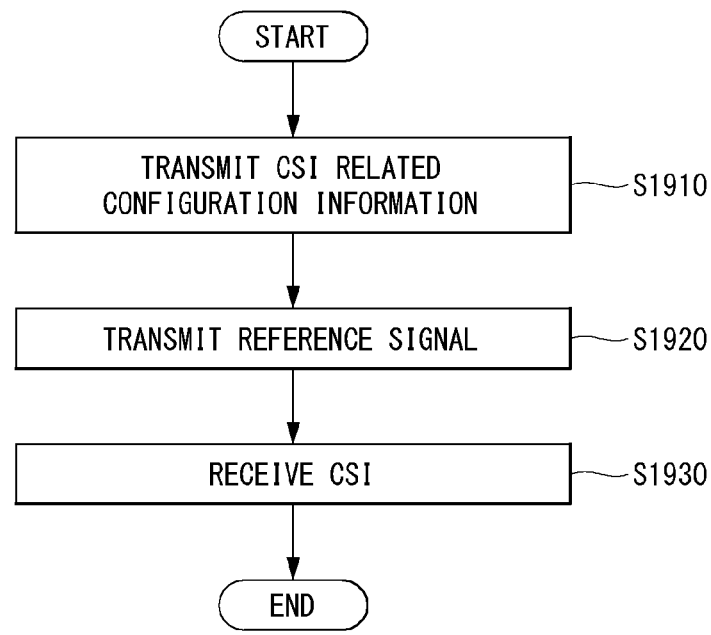

[Fig. 20]
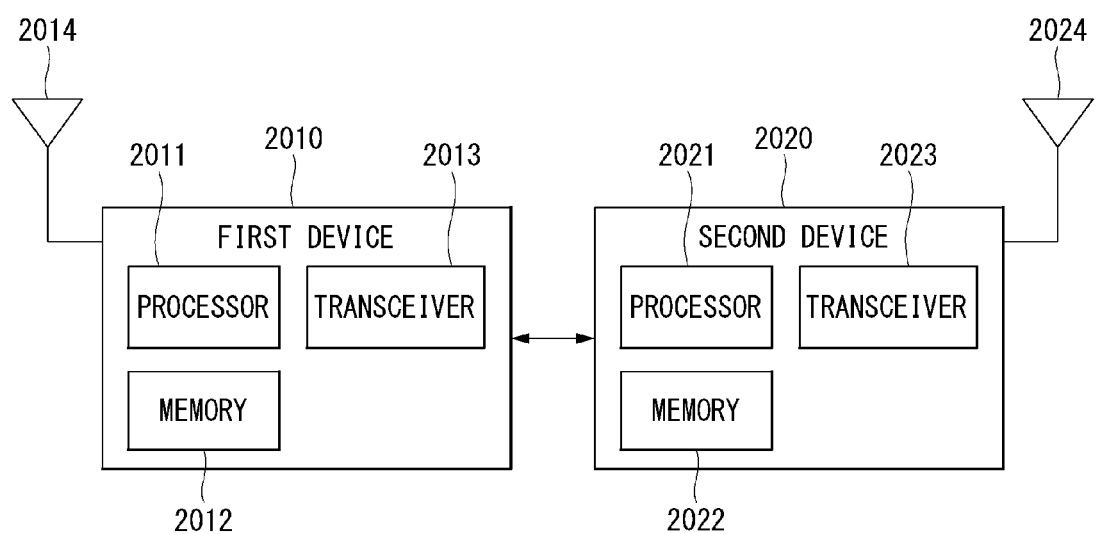

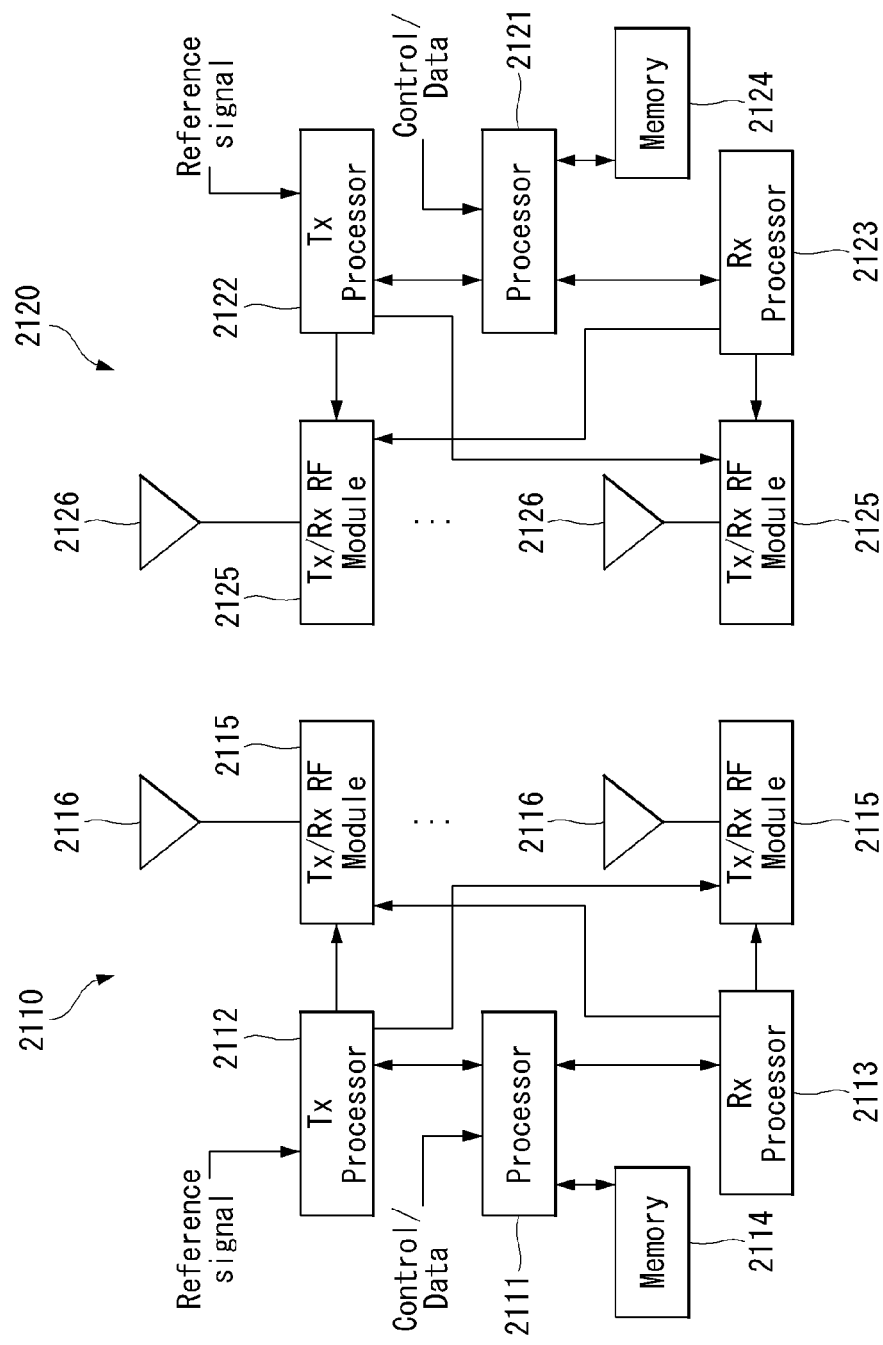
[FIG. 21]

[FIG. 22]
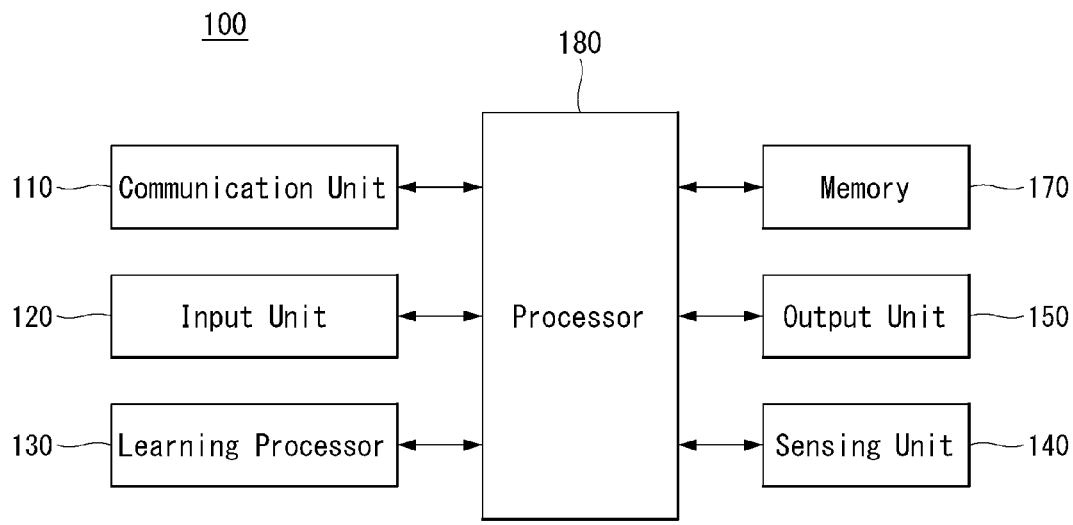
[FIG. 23]
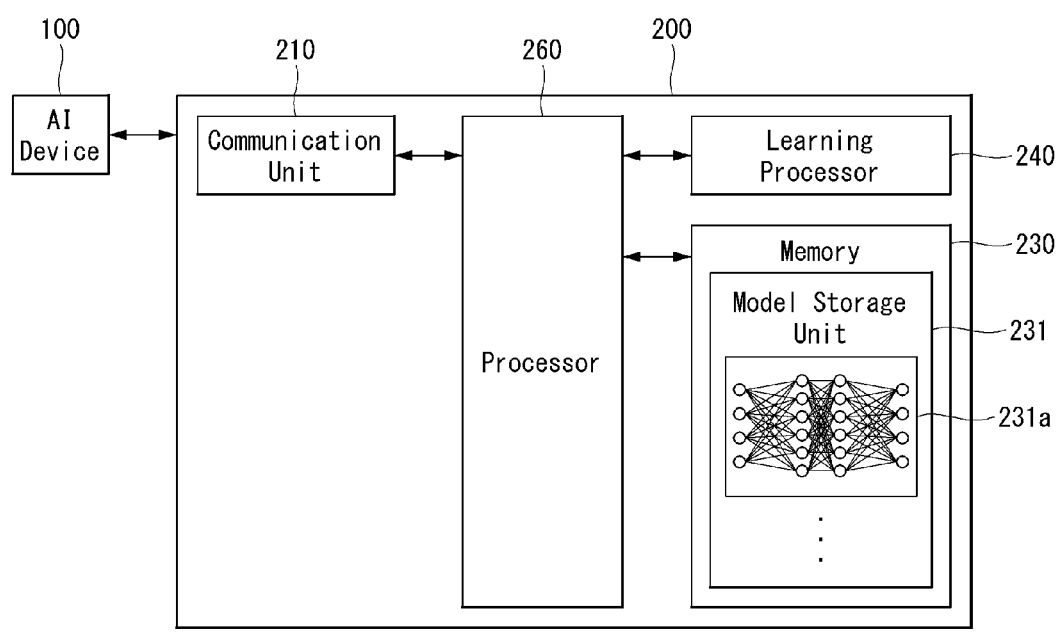

[FIG. 24]
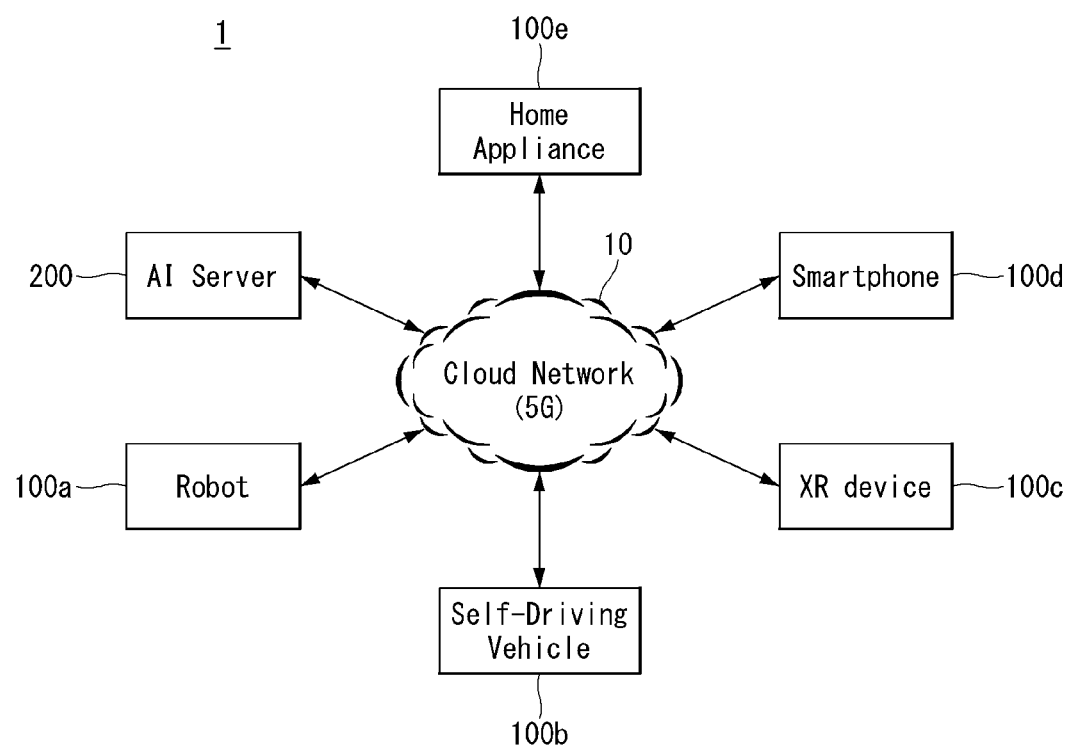

METHOD FOR TRANSMITTING OR RECEIVING CHANNEL STATE INFORMATION FOR PLURALITY OF BASE STATIONS IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/009971, filed on Aug. 8, 2019, which claims the benefit of Korean Application Nos. 10-2018-0092574, filed on Aug. 8, 2018, 10-2018-0114465, filed on Sep. 21, 2018, and 10-2019-0004196, filed on Jan. 11, 2019, the contents of which are all hereby incorporated by reference herein in their entirety.

TECHNICAL FIELD

The present disclosure relates to a wireless communication system, and more particularly, to a method for reporting channel state information (CSI) for a plurality of channels by a user equipment (UE) supported by a plurality of base stations, and an apparatus for supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An embodiment of the present disclosure provides a method for transmitting or receiving channel state information (CSI) for a plurality of base stations in a wireless communication system.

Specifically, an embodiment of the present disclosure provides a method for configuring CSI report related configuration information for CSI report for a plurality of base stations performing Coordinated Multi-Point (CoMP) Joint Transmission.

Furthermore, an embodiment of the present disclosure provides a method for assuming a reception beam at the time of calculating CSI and a method for calculating CSI for a plurality of base stations based on CSI report related configuration information.

Furthermore, an embodiment of the present disclosure provides a method for transmitting CSI to at least one base station among a plurality of base stations performing a CoMP operation and an encoding method therefor.

Technical problems to be solved by the present disclosure are not limited by the above-mentioned technical problems, and other technical problems which are not mentioned above can be clearly understood from the following description by those skilled in the art to which the present disclosure pertains.

Technical Solution

In an embodiment of the present disclosure, a method for reporting, by a user equipment (UE) supported by a plurality of base stations, channel state information (CSI) in a wireless communication system may include: receiving CSI report-related configuration information from at least one base station among the plurality of base stations; receiving a first reference signal (RS) from a first base station among the plurality of base stations via a specific reception beam; receiving a second reference signal from at least one base station except for the first base station among the plurality of base stations via the specific reception beam; calculating the CSI by performing measurement for the first reference signal and the second reference signal; and transmitting the CSI to the first base station, in which the UE may calculate the CSI by measuring, as interference, the second reference signal received via the specific reception beam.

Furthermore, in the method according to an embodiment of the present disclosure, the UE may receive an independent layer from each of the plurality of base stations.

Furthermore, in the method according to an embodiment of the present disclosure, the first reference signal and the second reference signal may be configured to have a Quasi co-location (QCL) relationship for a spatial RX parameter.

Furthermore, in the method according to an embodiment of the present disclosure, the CSI report-related configuration information may include channel measurement resource information, interference measurement resource information, and information on a CSI parameter.

Furthermore, in the method according to an embodiment of the present disclosure, the first reference signal and an interference measurement resource included in the interference measurement resource information may be configured to have the Quasi co-location (QCL) relationship for the spatial RX parameter.

Furthermore, in the method according to an embodiment of the present disclosure, the CSI report-related configuration information may be configured for each base station of the plurality of base stations.

Furthermore, in the method according to an embodiment of the present disclosure, the interference measurement resource information of the CSI report-related configuration information for the first base station may include the second reference signal.

Furthermore, the method according to an embodiment of the present disclosure may further include receiving linkage association information for the CSI report-related configuration information configured for each base station of the plurality of base stations.

Furthermore, in the method according to an embodiment of the present disclosure, when the first base station schedules the UE and another UE, the interference measurement resource information may further include Non Zero Power (NZP) Channel State Information-Reference Signal (CSI-RS) related information.

Furthermore, in the method according to an embodiment of the present disclosure, the UE may calculate the CSI by considering interference from the another UE.

Furthermore, in the method according to an embodiment of the present disclosure, when a common layer is received from the plurality of base stations, total interference may be calculated based on first interference received through the specific reception beam and second interference received through reception beams for base stations except for the first base station among the plurality of base stations, and the total interference may be calculated as one of i) a sum value of the first interference and the second interference, ii) an average value of the first interference and the second interference, and iii) a value acquired by multiplying and adding weights by the first interference and the second interference, respectively.

Furthermore, in the method according to an embodiment of the present disclosure, the CSI may include Channel Quality Information (CQI), and the CQI may correspond to a value calculated when the UE simultaneously receives the layers from the plurality of base stations.

Furthermore, in the method according to an embodiment of the present disclosure, when the CSI corresponds to a subband CSI report, the CSI may be separately encoded into part 1 and part 2, and part 2 may be constituted only by a Precoding Matrix Indicator (PMI) for each base station.

Furthermore, in the method according to an embodiment of the present disclosure, the CSI report-related configuration information may further include an uplink resource configuration for the CSI transmission, and the uplink resource configuration may be configured to correspond to the number of plurality of base stations.

In another embodiment of the present disclosure, a user equipment (UE) for reporting Channel State Information (CSI) in a wireless communication system may include: in which the UE may be supported by a plurality of base stations, a transceiving unit for transmitting or receiving a radio signal; and a processor functionally connected to the transceiving unit, in which the processor may be configured to control the transceiving unit to receive CSI report-related configuration information from at least one base station among the plurality of base stations, receive a first reference signal (RS) from a first base station among the plurality of base stations via a specific reception beam, receive a second reference signal from at least one base station except for the first base station among the plurality of base stations via the specific reception beam, calculate the CSI by performing measurement on the first reference signal and the second reference signal, and control the transceiving unit to transmit the CSI to the first base station, and the CSI may be calculated by measuring the second reference signal as interference.

Advantageous Effects

According to an embodiment of the present disclosure, a CSI report-related configuration (e.g., report setting) can be performed commonly or separately for a plurality of base stations performing Coordinated Multi-Point (CoMP) joint transmission.

Furthermore, according to an embodiment of the present disclosure, when CSI for the plurality of base stations performing the Coordinated Multi-Point (CoMP) joint transmission is calculated, accurate CSI for each base station can be calculated through a method for assuming a reception beam.

Furthermore, according to an embodiment of the present disclosure, CSI reporting to a plurality of base stations which operates in Coordinated Multi-Point (CoMP) can be performed.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates an example of physical resource block in NR.

FIG. 7 illustrates physical channels and general signal transmission used in a 3GPP system.

FIG. 8 illustrates an example of beamforming using SSB and CSI-RS.

FIG. 9 is a flowchart for describing a downlink beam management procedure using SSB.

FIG. 10 is a flowchart for describing a downlink beam management procedure using CSI-RS.

FIG. 11 is a diagram for describing a procedure of determining a reception beam in a downlink beam management procedure using CSI-RS.

FIG. 12 is a diagram for describing a procedure of determining a transmission beam in a downlink beam management procedure using CSI-RS.

FIG. 13 is a diagram for describing resource allocation in time and frequency domains in a downlink beam management procedure using CSI-RS.

FIG. 14 is a diagram for describing an uplink beam management procedure using SRS.

FIG. 15 is a flowchart for describing an uplink beam management procedure using SRS.

FIG. 16 is a flowchart illustrating an example of a CSI related procedure.

FIG. 17 illustrates an example of two TPs performing a CoMP operation and a UE supported by two TPs.

FIG. 18 illustrates an example of an operation flowchart of a UE reporting channel state information to which a method proposed by the present disclosure may be applied.

FIG. 19 illustrates an example of an operation flowchart of a base station receiving channel state information to which a method proposed by the present disclosure may be applied.

FIG. 20 is a block diagram of a wireless communication device to which methods proposed by the present disclosure may be applied.

FIG. 21 illustrates another example of a block diagram of a wireless communication device to which methods proposed by the present disclosure may be applied.

FIG. 22 illustrates an AI device 100 according to an embodiment of the present disclosure.

FIG. 23 illustrates an AI server 200 according to an embodiment of the present disclosure.

FIG. 24 illustrates an AI system 1 according to an embodiment of the present disclosure.

MODE FOR INVENTION

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR(Augmented Reality) device, VR(Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR(Augmented Reality) device, VR(Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or P). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher there than, a bandwidth larger than 24.25 GHz is supported in order to overcome phase noise.

An NR frequency band is defined as frequency ranges of two types (FR1 and FR2). FR1 may mean a range of 6 GHz or less (e.g., 450 Mhz to 6 Ghz) and FR2 may mean as a range of 6 GHz or more (e.g., 24.25 GHz-52.6 GHz) may mean millimeter wave (mmW). FR1 may support SCS of 15, 30, and 60 kHz and FR2 may support SCS of 60, 120, and 240 kHz.

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties includes at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̃), where k=0, . . . , $N_{RB}^{\mu}N_{sc}^{RB}-1$ is an index on a frequency domain, and l̃=0, . . . , $2^{\mu}N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̃) for the numerology P and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

FIG. 6 illustrates an example of physical resource block in NR.

Physical Channel and General Signal Transmission

FIG. 7 illustrates physical channels and general signal transmission used in a 3GPP system. In a wireless communication system, the UE receives information from the eNB through Downlink (DL) and the UE transmits information to the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management(BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 8 illustrates an example of beamforming using SSB and CSI-RS.

As illustrated in FIG. 8, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 9 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S910).

Table 4 shows an example of CSI-ResourceConfig IE and as shown in Table 4, a BM configuration using the SSB is not separately defined and the SSB is configured like the CSI-RS resource.

TABLE 4

```
-- ASN1START
-- TAG-CSI-RESOURCECONFIG-START
CSI-ResourceConfig ::=          SEQUENCE {
    csi-ResourceConfigId        CSI-ResourceConfigId,
    csi-RS-ResourceSetList      CHOICE {
        nzp-CSI-RS-SSB                  SEQUENCE {
            nzp-CSI-RS-ResourceSetList          SEQUENCE (SIZE
(1..maxNrofNZP-CSI-RS-ResourceSetsPerConfig)) OF NZP-CSI-RS-ResourceSetId
OPTIONAL,
            csi-SSB-ResourceSetList             SEQUENCE (SIZE
(1..maxNrofCSI-SSB-ResourceSetsPerConfig)) OF CSI-SSB-ResourceSetId
            OPTIONAL
        },
        csi-IM-ResourceSetList          SEQUENCE (SIZE (1..maxNrofCSI-IM-
```

TABLE 4-continued

```
ResourceSetsPerConfig)) OF CSI-IM-ResourceSetId
    },
    bwp-Id                  BWP-Id,
    resourceType            ENUMERATED { aperiodic, semiPersistent,
periodic },
    ...
}
-- TAG-CSI-RESOURCECONFIGTOADDMOD-STOP
-- ASN1STOP
```

In Table 4, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S920).

When CSI-RS reportConfig associated with reporting of SSBRI and L1-RSRP is configured, the UE (beam) reports to the eNB best SSBRI and L1-RSRP corresponding thereto (S930).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 10 illustrates an example of a downlink beam management procedure using a Channel State Information-Reference Signal (CSI-RS).

FIG. 10(a) illustrates an Rx beam determination (or refinement) procedure of the UE and FIG. 10(b) illustrates a Tx beam sweeping procedure of the eNB. Further, FIG. 10(a) illustrates a case where the repetition parameter is configured to 'ON' and FIG. 10(b) illustrates a case where the repetition parameter is configured to 'OFF'.

Referring to FIG. 10(a) and FIG. 11, an Rx beam determination process of the UE will be described.

FIG. 11 is a flowchart showing an example of a RX beam determination process of a UE in the DL BM procedure using CSI-RS.

In the FIG. 11, the UE receives, from the eNB, NZP CSI-RS resource set IE including higher layer parameter repetition through RRC signaling (S1110).

Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1120).

The UE determines the Rx beam thereof (S1130).

The UE may skip a CSI report and transmit a CSI report including CRI/L1-RSRP to the eNB (S1140).

In this case, reportQuantity of CSI report config may be configured as "No report (or None)" or CRI and L1-RSRP".

That is, when repetition is configured to "ON", the UE may skip the CSI report or report ID information (CRI) of a beam pair related priority beam and a quality value (L1-RSRP) thereof.

Referring to FIG. 10(b) and FIG. 12, a Tx beam determination process of the eNB will be described.

FIG. 12 is a flowchart showing an example of a TX beam determination process of an eNB.

The UE receives, from the eNB, NZP CSI-RS resource set IE including higher layer parameter repetition through RRC signaling (S1210).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1220).

The UE selects (or determines) a best beam (S1230), and reports to the eNB an ID for the selected beam and related quality information (e.g., L1-RSRP) (S1240).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 13 illustrates an example of resource allocation in time and frequency domains associated with an operation of FIG. 10.

Referring to FIG. 13, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 5 shows an example of TCI-State IE.

The TCI-State IE is associated with a quasi co-location (QCL) type corresponding to one or two DL reference signals (RSs).

In Table 5, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL(Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2

TABLE 5

```
-- ASN1START
-- TAG-TCI-STATE-START
TCI-State ::=            SEQUENCE {
    tci-StateId              TCI-StateId,
    qcl-Type1                QCL-Info,
    qcl-Type2                QCL-Info
                     OPTIONAL,    -- Need R
    ...
}
QCL-Info ::=             SEQUENCE {
    cell                     ServCellIndex
                     OPTIONAL,    -- Need R
    bwp-Id                   BWP-Id
                     OPTIONAL,    -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
-- TAG-TCI-STATE-STOP
-- ASN1STOP
```

(when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication".

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 14 illustrates an example of an uplink beam management procedure using a Sounding Reference Signal (SRS).

FIG. 14(a) illustrates an Rx beam determination procedure of the eNB and FIG. 14(b) illustrates a Tx beam sweeping procedure of the UE.

FIG. 15 is a flowchart showing an example of an uplink beam management procedure using the SRS.

The UE receives, from the eNB, RRC signaling (e.g., SRS-Config IE) including a (higher layer parameter) usage parameter configured as 'beam management' (S1510).

Table 6 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-ResourceTrigger (L1 DCI).

TABLE 6

```
--ASN1START
-- TAG-MAC-CELL-GROUP-CONFIG-START
SRS-Config ::=                          SEQUENCE {
    srs-ResourceSetToReleaseList            SEQUENCE (SIZE(1..maxNrofSRS-
ResourceSets)) OF SRS-ResourceSetId             OPTIONAL, -- Need N
    srs-ResourceSetToAddModList             SEQUENCE (SIZE(1..maxNrofSRS-
ResourceSets)) OF SRS-ResourceSet               OPTIONAL, -- Need N
    srs-ResourceToReleaseList               SEQUENCE (SIZE(1..maxNrofSRS-
Resources)) OF SRS-ResourceId                   OPTIONAL, -- Need N
    srs-ResourceToAddModList                SEQUENCE (SIZE(1..maxNrofSRS-
Resources)) OF SRS-Resource                     OPTIONAL, -- Need N
    tpc-Accumulation                        ENUMERATED {disabled}
                                            OPTIONAL, -- Need S
    ...
}
SRS-ResourceSet ::=                     SEQUENCE {
    srs-ResourceSetId                       SRS-ResourceSetId,
    srs-ResourceIdList                      SEQUENCE (SIZE(1..maxNrofSRS-
ResourcesPerSet)) OF SRS-ResourceId             OPTIONAL, -- Cond Setup
    resourceType                            CHOICE {
        aperiodic                               SEQUENCE {
            aperiodicSRS-ResourceTrigger            INTEGER (1..maxNrofSRS-
TriggerStates-1),
            csi-RS                                  NZP-CSI-RS-ResourceId
                                                OPTIONAL, -- Cond NonCodebook
            slotOffset                              INTEGER (1..32)
                                                OPTIONAL, -- Need S
        ...
    },
```

TABLE 6-continued

```
    semi-persistent                       SEQUENCE {
        associatedCSI-RS                       NZP-CSI-RS-ResourceId
                                               OPTIONAL, -- Cond NonCodebook
        ...
    },
    periodic                              SEQUENCE {
        associatedCSI-RS                       NZP-CSI-RS-ResourceId
                                               OPTIONAL, -- Cond NonCodebook
        ...
    }
},
usage                                     ENUMERATED {beamManagement,
codebook, nonCodebook, antennaSwitching},
    alpha                                     Alpha
                                              OPTIONAL, -- Need S
    p0                                        INTEGER (-202..24)
                                              OPTIONAL, -- Cond Setup
    pathlossReferenceRS                       CHOICE {
        ssb-Index                                 SSB-Index,
        csi-RS-Index                              NZP-CSI-RS-ResourceId
SRS-SpatialRelationInfo ::=               SEQUENCE {
    servingCellId                             ServCellIndex
    OPTIONAL, -- Need S
    referenceSignal                           CHOICE {
        ssb-Index                                 SSB-Index,
        csi-RS-Index                              NZP-CSI-RS-ResourceId,
        srs                                       SEQUENCE {
            resourceId                                SRS-ResourceId,
            uplinkBWP                                 BWP-Id
        }
    }
}
}
SRS-ResourceId ::=                        INTEGER (0..maxNrofSRS-Resources-1)
```

In Table 6, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1520). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1530).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1540).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 14(a).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 14(b).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Hear, the CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

FIG. 16 is a flowchart showing an example of a CSI related procedure.

Referring to the FIG. 16, in order to perform one of usages of the CSI-RS, a terminal (e.g., user equipment (UE)) receives, from a base station (e.g., general Node B or gNB), configuration information related to the CSI through radio resource control (RRC) signaling (S1610).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 7 shows an example of NZP CSI-RS resource set IE. As shown in Table 7, parameters (e.g., a BM related 'repetition' parameter and a tracking related 'trs-Info' parameter) representing the usage may be configured for each NZP CSI-RS resource set.

TABLE 7

```
-- ASN1START
-- TAG-NZP-CSI-RS-RESOURCESET-START
NZP-CSI-RS-ResourceSet ::=   SEQUENCE {
    nzp-CSI-ResourceSetId         NZP-CSI-RS-ResourceSetId,
    nzp-CSI-RS-Resources          SEQUENCE (SIZE (1..maxNrofNZP-CSI-RS-
ResourcesPerSet)) OF NZP-CSI-RS-ResourceId,
    repetition                    ENUMERATED { on, off }
    aperiodicTriggeringOffset     INTEGER (0..4)
    trs-Info                      ENUMERATED {true}
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 8 below shows an example of CSI-ReportConfig IE.

TABLE 8

```
-- ASN1START
-- TAG-CSI-RESOURCECONFIG-START
CSI-ReportConfig ::=                         SEQUENCE {
   reportConfigId                              CSI-ReportConfigId,
   carrier                                     ServCellIndex         OPTIONAL, -
- Need S
   resourcesForChannelMeasurement              CSI-ResourceConfigId,
   csi-IM-ResourcesForInterference             CSI-ResourceConfigId  OPTIONAL, -
- Need R
   nzp-CSI-RS-ResourceForInterference          CSI-ResourceConfigId  OPTIONAL, -
- Need R
   reportConfigType                            CHOICE {
      periodic                                   SEQUENCE {
         reportSlotConfig                          CSI-
ReportPeriodicityAndOffset,
         pucch-CSI-ResourceList                    SEQUENCE (SIZE
```

TABLE 8-continued

```
(1..maxNrofBWPs)) OF PUCCH-CSI-Resource
    },
    semiPersistentOnPUCCH              SEQUENCE {
        reportSlotConfig                   CSI-
ReportPeriodicityAndOffset,
        pucch-CSI-ResourceList             SEQUENCE (SIZE
(1..maxNrofBWPs)) OF PUCCH-CSI-Resource
    },
    semiPersistentOnPUSCH              SEQUENCE {
        reportSlotConfig                   ENUMERATED {s15, s110, s120,
s140, s180, s1160, s1320},
        reportSlotOffsetList               SEQUENCE (SIZE (1..maxNrofUL-
Allocations)) OF INTEGER(0..32),
        p0alpha                            P0-PUSCH-AlphaSetId
    },
    aperiodic                          SEQUENCE {
        reportSlotOffsetList               SEQUENCE (SIZE (1..maxNrofUL-
Allocations)) OF INTEGER (0..32)
}
    },
    reportQuantity                     CHOICE {
        none                               NULL,
        cri-RI-PMI-CQI                     NULL,
        cri-RI-i1                          NULL,
        cri-RI-i1-CQI                      SEQUENCE {
            pdsch-BundleSizeForCSI             ENUMERATED {n2, n4}
OPTIONAL
        },
        cri-RI-CQI                         NULL,
        cri-RSRP                           NULL,
        ssb-Index-RSRP                     NULL,
        cri-RI-LI-PMI-CQI                  NULL
    },
```

The UE measures CSI based on configuration information related to the CSI (S1620). The CSI measurement may include (1) a CSI-RS reception process (S1621) and (2) a process of computing the CSI through the received CSI-RS (S1622). Detailed description will be described later.

For the CSI-RS, resource element (RE) mapping of the CSI-RS resource is configured in time and frequency domains by higher layer parameter CSI-RS-ResourceMapping.

Table 9 shows an example of CSI-RS-ResourceMapping IE.

TABLE 9

```
-- ASN1START
-- TAG-CSI-RS-RESOURCEMAPPING-START
CSI-RS-ResourceMapping ::=       SEQUENCE {
    frequencyDomainAllocation        CHOICE {
        row1                             BIT STRING (SIZE (4)),
        row2                             BIT STRING (SIZE (12)),
        row4                             BIT STRING (SIZE (3)),
        other                            BIT STRING (SIZE (6))
    },
    nrofPorts                        ENUMERATED
                                     {p1, p2, p4, p8, p12, p16, p24, p32},
    firstOFDMSymbolInTimeDomain      INTEGER (0..13),
    firstOFDMSymbolInTimeDomain2     INTEGER (2..12)
    cdm-Type                         ENUMERATED {noCDM, fd-CDM2,
cdm4-FD2-TD2, cdm8-FD2-TD4},
    density                          CHOICE {
        dot5                             ENUMERATED {evenPRBs, oddPRBs},
        one                              NULL,
        three                            NULL,
        spare                            NULL
    },
    freqBand                         CSI-FrequencyOccupation,
    ...
}
```

In Table 9, a density (D) represents a density of the CSI-RS resource measured in RE/port/physical resource block (PRB) and nrofPorts represents the number of antenna ports.

Further, the UE reports the measured CSI to the eNB (S1630).

Here, in the case where a quantity of CSI-ReportConfig of Table 9 is configured to 'none (or No report)', the UE may skip the report.

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). Here, the CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
  Each NZP CSI-RS port configured for interference measurement corresponds to an interference transport layer.
  In all interference transport layers of the NZP CSI-RS port for interference measurement, an energy per resource element (EPRE) ratio is considered.
  Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.
  i) The periodic CSI reporting is performed on short PUCCH and long PUCCH. The periodicity and slot offset of the periodic CSI reporting may be configured through RRC and refer to the CSI-ReportConfig IE.
  ii) SP CSI reporting is performed on short PUCCH, long PUCCH, or PUSCH.
  In the case of SP CSI on the short/long PUCCH, the periodicity and the slot offset are configured as the RRC and the CSI reporting to separate MAC CE is activated/deactivated.
  In the case of the SP CSI on the PUSCH, the periodicity of the SP CSI reporting is configured through the RRC, but the slot offset is not configured through the RRC and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. In addition, the SP CSI reporting has the same or similar activation/deactivation as a mechanism having data transmission on SPS PUSCH.
  iii) The aperiodic CSI reporting is performed on the PUSCH and is triggered by the DCI. In this case, information related to triggering aperiodic CSI reporting is transmitted/indicated/configured via MAC-CE.

In the case of AP CSI having AP CSI-RS, an AP CSI-RS timing is configured by the RRC. Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Hear, Z represents a minimum CSI processing time from the reception of the aperiodic CSI triggering DCI to the execution of the CSI reporting. In addition, Z' represents a minimum CSI processing time from the reception of the CSI-RS for channel/interference to the execution of the CSI reporting.

Additionally, the UE reports the number of CSIs which may be simultaneously calculated.

CSI Framework Related Contents

In the NR system, the following contents are discussed in relation to a CSI framework.

The UE may be configured to CSI reporting settings, M≥1 resource settings, and 1 CSI measurement setting, and the CSI measurement setting includes L≥1 links. Each of the L links corresponds to the CSI reporting setting and the resource setting.

At least the following constituent parameters may be signaled through RRC at least for CSI acquisition:
  N, M, and L—explicitly or implicitly indicated
  Each CSI reporting setting may include at least one of the following: reported CSI parameter(s), CSI Type (I or II) if reported, codebook configuration including codebook subset restriction, time-domain behavior, frequency granularity for CQI and PMI, measurement restriction configurations
  In each resource setting: A configuration of S≥1 CSI-RS resource set(s) (Note: each corresponds to another selection from "pool" of all CSI-RS resources configured to the UE, A configuration of Ks≥1 CSI-RS resources for each set s, including at least: Information of mapping to REs, the number of ports, time-domain behavior, etc., may be included.

Each of the L links of the CSI measurement setting may include CSI reporting setting indication, Resource setting indication, and quantity to be measured (either channel or interference). One CSI reporting setting may be linked to one or multiple resource settings. Multiple CSI reporting settings may be linked to the same resource setting.

At least the following contents may be dynamically selected by an L1 or L2 signal scheme.

One or multiple CSI reporting settings in the CSI measurement setting

One or multiple CSI-RS resource sets selected from at least one resource setting One or multiple CSI-RS resources selected from at least one CSI-RS resource set.

Meanwhile, the following contents are discussed for NR reception in relation to multi-TRP operations.

A single NR-PDCCH reserves a single NR-PDSCH in which a separate layer is transmitted in a separate TRP.

Multiple NR-PDCCHs scheduling respective NR-PDSCHs transmitted from individual TRPs, respectively Note: A case of a single NR-PDSCH in which a single NR-PDCCH is jointly transmitted in all TRPs may be performed by a transparent scheme. Details of CSI feedback for the above cases may be separately discussed.

Coordinated Multi-Point transmission and reception (CoMP) (hereinafter, referred to as CoMP) refers to a technology in which a plurality of eNBs communicate in coordination with each other in order to enhance a transmission quality for a UE which is positioned on a boundary of a cell in a mobile communication network. Two or more eNBs operate in the CoMP to enhance transmission efficiency. The CoMP technology for enhancing UE and system performances includes operation scenarios including joint transmission (JT), coordinated scheduling (CS), coordinated beamforming (CB), dynamic port selection (DPS), etc., of a plurality of eNBs.

A CSI measurement and reporting method for a plurality of eNBs supporting the CoMP operation needs to be distinguished from a CSI measurement and reporting method for one eNB in the related art. In particular, a CSI measurement and/or reporting method for a plurality of eNBs supporting CoMP joint transmission (JT) needs to be performed by a different scheme from the CSI for one eNB.

Hereinafter, the present disclosure proposes operations required for the UE to calculate downlink CSI for the plurality of eNBs supporting the CoMP joint transmission (JT).

In the present disclosure, the following terms are unified and used for convenience of description. However, the terms do not limit the scope of the present disclosure.

CMR: Channel Measurement Resource
IMR: Interference Measurement Resource
TP: Transmission Point (may be replaced with a term such as eNB, TRP, panel, etc.)
UE: User Equipment
CSI: Channel State Information
RI: Rank Indicator
LI: Layer Indicator
PMI: Precoding Matrix Indicator
CQI: Channel Quality Information
SINR: Signal to Noise and Interference Ratio
NZBI: Number of non-zero wideband amplitude coefficients
CSI-RS: Channel State Information-Reference Signal
CoMP: Coordinated Multi-Point QCL: Quasi-co-location
Rx: Reception
Tx: Transmission In addition, in the present disclosure, for convenience of description, it is assumed that two TPs perform CoMP joint transmission, and layers transmitted by respective TPs are independent (different) layer from each other. It is assumed that the number of the TP (e.g., TP index), and a reference signal transmitted from each TP, and the number of a CSI parameter for each TP correspond. For example, the number of the TP may be represented by CSI-RS1 transmitted by TP1, and CSI1 parameters (e.g., RI1, PMI1, and CQI1) for the TP1. However, the assumptions are just for convenience of the description and do not limit the scope of the present disclosure. Therefore, the assumptions may be extensively applied even to a case where three or more TPs perform the CoMP joint transmission, and extensively applied even to coherent or non-coherent joint transmission of transmitting a common (identical) layer in addition to a case where each TP transmits an independent layer.

FIG. 17 illustrates an example of two TPs performing a CoMP operation and a UE supported by two TPs based on the assumptions. FIG. 17 is just one example for helping understanding of the present disclosure, but does not the scope of the present disclosure. Referring to FIG. 17, the TP1 and TP2 may perform the CoMP operation, and the TP1 and the TP2 may simultaneously transmit the layer to UE A. The TP2 may simultaneously support two UEs. The TP1 and the TP2 share data through backhaul.

In the present disclosure, a meaning of measuring a channel or interference by applying the same Rx beam between two signals (e.g., between CSI-RS or between CSI-RS and CSI-IM) is the same as a meaning of assuming the same spatial Rx parameter between two signals or a meaning of assuming the same QCL-Type D.

Furthermore, the methods/embodiments described in the present disclosure are only classified for convenience of description and it is needless to say that some components of any method/embodiment may be substituted with some components of another method/embodiment or both components may be applied in combination with each other.

Method 1: Calculating CSI Related Configuration and CSI for Plurality of TPs Supporting CoMP Operation It is assumed that in the case of the TP1 and the TP2 supporting the CoMP operation, the TP1 transmits the CSI-RS1 to the UE and the TP2 transmits the CSI-RS2 to the UE for CSI measurement. A plurality of TPs (e.g., TP1 and TP2) supporting the CoMP operation may transmit CSI report related configuration information to the UE in order to receive a report for downlink CSI. In other words, at least one TP of the plurality of TPs supporting the CoMP operation may configure the following report setting to the UE for CSI calculation and reporting. The CSI reporting setting may correspond to the CSI report related configuration information.

<Case 1-1>

The CSI reporting setting for a plurality of TPs performing the CoMP joint transmission may be comprised by one reporting setting. Table 10 shows an example of one CSI reporting setting for TP1 and TP2. Referring to Table 10, the CSI reporting setting may include information on CMR, IMR, and CSI parameters (contents) to be fed back for each TP. The CMR may include CSI-RS information for each TP and the IMR may include CSI-IM information.

TABLE 10

| Report setting | CMR: CSI-RS1 for TP1, CSI-RS2 for TP2<br>IMR: CSI-IM(ZP CSI-RS)<br>CSI feedback contents: RI1, PMI1, RI2, PMI2, CQI |
|---|---|

The UE may calculate the RI and the PMI for the channel of the CSI-RS for each TP and calculate achievable CQI when all TPs performing the CoMP joint transmission simultaneously transmit data. As a specific example, the UE may calculate RIi and PMIi for the channel of CSI-RSi (i=1, 2), and the TP1 may transmit data by applying RI1 and PMI1 and at the same time, the TP2 may calculate achievable CQI when transmitting data by applying RI2 and PMI2. Here, i may correspond to an index of the TP.

In this case, it is assumed that the UE receives the data of the TP1 and the data of the TP2 through two different (analog) Rx beams (or Rx panels), respectively.

The data of the TP1 is received through Rx beam 1 (which is the Rx beam of the CSI-RS1), and in this case, noise received together through Rx beam 1 and interference from other cells not participating in CoMP are received. In addition, the data of the TP2 received through Rx beam 1 may act as inter layer interference. Specifically, when calculating data reception SINR (or CQI) from the TP1, the UE measures the CSI-IM through the Rx beam 1 through which the CSI-RS1 is received to estimate noise and interference from other cells not participating in CoMP, and measures the CSI-RS2 through the Rx beam 1 and then applies the RI2 and the PMI2 to the corresponding channel to estimate the inter layer interference. Similarly, when calculating the data reception SINR (or CQI) of the TP2, the interference may be calculated (estimated) using the CSI-IM and the CSI-RS1 received through the Rx beam 2.

Equation 3 shows an equation in which the UE calculates SINR (or CQI).

$$[H1 \ H2]\begin{bmatrix} PMI1 & 0 \\ 0 & PMI2 \end{bmatrix}\begin{bmatrix} x1 \\ x2 \end{bmatrix} + N \quad \text{[Equation 3]}$$

In Equation 3, H1 and H2 represent channels which the UE measures from the CSI-RS1 and the CSI-RS2, respectively, and N represents a value which the UE measures through the CSI-IM. x1 and x2 represent data symbols which the TP1 and the TP2 transmit, respectively.

when calculating the CSI, the UE may measure all of H1, H2, and N1 of Equation 6 through the Rx beam 1 in order to calculate reception SINR of the data transmitted by the TP1. Specifically, signal power from H1*PMI1*x1, interference power from the TP2 from H2*PMI2*x2, and noise from N and interference power of other cells are measured to calculate the SINR (or CQI).

When calculating the CSI, the UE may measure all of H1, H2, and N1 of Equation 6 through the Rx beam 2 in order to calculate reception SINR of the data transmitted by the TP2. Specifically, signal power from H2*PMI2*x2, interference power from the TP1 from H1*PMI1*x1, and noise from N and interference power of other cells are measured to calculate the SINR (or CQI).

As a result, the UE may measure the interference by assuming the following for the CSI-IM. The CSI-IM may be assumed the same QCL-type D (QCL for the spatial Rx parameter) as all CSI-RSs (e.g., CSI-RS1 and CSI-RS2) given as the CMR. However, when calculating SINRi or CQIi that assumes the CSI-RSi through a desired channel, it may be assumed that the CSI-IM and the CSI-RSi have the QCL-Type D (here, i represents the index of the base station).

Furthermore, when calculating the SINR or the CQI for each of a plurality of CSI-RSs given as the CMR, i.e., when calculating the SINRi or the CQIi for the CSI-RSi, the UE may assume that all of the remaining CSI-RSs have the same spatial Rx parameter as the CSI-RSi (i.e., may assume that the remaining CSI-RSs disregard QCL-Type D attributes thereof and follow the QCL-Type D of the CSI-RSi).

<Case 1-2>

The UE may receive the configuration for the CSI reporting setting for each of a plurality of TPs performing the CoMP joint transmission. Table 11 shows a configuration example of the CSI reporting setting for each of the TP1 and the TP2. In Table 11, reporting setting 1 is for the TP1 and reporting setting 2 is for the TP2. IMR of reporting setting 1 for the TP1 may include the CMR of the TP2. Similarly, the IMR of reporting setting 2 for the TP2 may include the CMR of the TP1. Furthermore, the UE may receive, from the TP, a configuration that the reporting setting 1 and the reporting setting 2 are linked to each other for CoMP CSI calculation.

TABLE 11

| Report setting 1 | CMR: CSI-RS1 for TP1<br>IMR: CSI-IM(ZP CSI-RS), CSI-RS2<br>CSI feedback contents: RI1, PMI1, CQI1 |
|---|---|
| Report setting 2 | CMR: CSI-RS2 for TP2<br>IMR: CSI-IM(ZP CSI-RS), CSI-RS1<br>CSI feedback contents: RI2, PMI2, CQI2 |

The UE may calculate the CSI based on the reporting setting. Specifically, the UE may receive the CMR and the IMR through Rx beam 1, which is the Rx beam of the CMR, based on the reporting setting 1, and may estimate H1, H2, and N of Equation 3. In addition, the UE may estimate the inter layer interference received from the TP2 by applying RI2 and PMI2 of the reporting setting 2 linked to the reporting setting 1 to H2 (channel estimated from the CSI-RS2), and calculate the reception SINR (or CQI) of the data transmitted by the TP1. The UE may receive the CMR and the IMR through the Rx beam 2, which is the Rx beam of the CMR, based on the reporting setting 2, and may estimate H1, H2, and N of Equation 3. In addition, the UE may estimate the inter layer interference received from the TP1 by applying RI1 and PMI1 of the reporting setting 1 connected to the reporting setting 2 to H1 (channel estimated from the CSI-RS1), and calculate the reception SINR (or CQI) of the data transmitted by the TP2.

<Case 1-3>

The UE may be configured the CSI reporting setting for each of a plurality of TPs performing the CoMP joint transmission. In this case, IMR included in report setting for random TP does not consider CSI-RS transmitted from another TP as the IMR. Table 12 shows a configuration example of the CSI report setting for each of the TP1 and the TP2. In Table 12, the report setting 1 is for the TP1 and the report setting 2 is for the TP2. Furthermore, the UE may receive, from the TP, a configuration that the reporting setting 1 and the reporting setting 2 are linked to each other for CoMP CSI calculation.

TABLE 12

| Report setting 1 | CMR: CSI-RS1 for TP1<br>IMR: CSI-IM(ZP CSI-RS)<br>CSI feedback contents: RI1, PMI1, CQI1 |
|---|---|
| Report setting 2 | CMR: CSI-RS2 for TP2<br>IMR: CSI-IM(ZP CSI-RS)<br>CSI feedback contents: RI2, PMI2, CQI2 |

The UE may calculate the CSI based on the report setting. Specifically, the UE may receive the CMR and the CSI-IM through Rx beam 1, which is the Rx beam of the CMR, based on the reporting setting 1, and may estimate H1 and N of Equation 3. In addition, in order to estimate the inter layer interference received from the TP2, the UE measures H2 from the CMR of the report setting 2 linked to the report setting 1 and applies RI2 and PMI2 to H2 (channel estimated from CSI-RS2) to calculate the inter layer interference received from the TP2. In this case, H2 may be estimated by measuring the CMR of the report setting 2 through the Rx beam 1 used for receiving the CMR of the report setting 1. By using this, the UE may calculate the reception SINR or CQI of the data transmitted by the TP1.

The UE may receive the CMR and the CSI-IM through the Rx beam 2, which is the reception beam of the CMR, based on the report setting 2. As a result, H2 and N of Equation 3 may be estimated. In addition, in order to estimate the inter layer interference received from the TP1, the UE measures H1 from the CMR of the report setting 1 linked to the report setting 2 and applies RI1 and PMI1 to H1 (channel estimated from CSI-RS1) to calculate the inter layer interference received from the TP1. In this case, H1 may be estimated by measuring the CMR of the report setting 1 through the Rx beam 2 used for receiving the CMR of the report setting 2. By using this, the UE may calculate the reception SINR or CQI of the data transmitted by the TP2.

When multiple report settings corresponding to a plurality of TPs (or TRPs or panels) are configured, such as the report setting of Case 1-2 or Case 1-3 described above, the UE may receive a configuration that multiple report settings are linked to each other for CoMP CSI calculation from the TP through explicit signaling. Alternatively, the UE may implicitly receive the configuration that multiple report settings are linked to each other for CoMP CSI calculation without an indication through the explicit signaling. For example, when a PUCCH resource, and a PUCCH transmission period and offset defined in each report setting are identical, the UE may assume that multiple report settings are linked to each other for CoMP CSI calculation. Alternatively, when time and frequency resources corresponding to (semi-persistent or aperiodic) PUSCH overlap, the UE may assume that multiple report settings are linked to each other for CoMP CSI calculation.

<Case 1-4>

In the methods of Case 1-1 to Case 1-3 described above, it is assumed that a plurality of TPs performing the CoMP joint transmission transmit independent layers, respectively. Additionally, a case where a plurality of TPs performing the CoMP joint transmission transmits the common layer may be considered. When the TP1 and the TP2 performing the CoMP joint transmission transmit the common layer, the UE receives the corresponding layer from both TPs. In this case, at least one of the TP1 and the TP2 may configure report setting of Case 1-1 or Case 1-3 described above to the UE.

Equation 4 shows an equation of calculating SINR (or CQI) when the UE receives the common layer from the TP1 and the TP2.

$$[H1 \quad H2]\begin{bmatrix} PMI1 & 0 \\ 0 & PMI2 \end{bmatrix}[x1] + N \qquad \text{[Equation 4]}$$

In Equation 4, H1 and H2 represent channels which the UE measures from the CSI-RS1 and the CSI-RS2, respectively, and N represents a value which the UE measures through the CSI-IM. x1 represents a data symbol simultaneously by the TP1 and the TP2 (in Equation 4, the PMI1 and the PMI2 are distinguished, but in coherent joint transmission using one PMI, x1 may be replaced with one PMI and expressed like $$\begin{bmatrix} PMI1 \\ PMI2 \end{bmatrix} = [PMI]).$$

The UE may assume the reception beam as follows at the time of receiving the CSI-RS1, the CSI-RS2, and the CSI-IM. The UE may assume the followings for the CSI-IM and measure the interference. The CSI-IM may be assumed the same QCL-type D (QCL for the spatial Rx parameter) as all CSI-RSs (e.g., both CSI-RS1 and CSI-RS2) given as the CMR. That is, the UE may receive the CSI-IM through the Rx beam 1 which is the Rx beam of the CSI-RS1 and at the same time, may receive the CSI-IM through the Rx beam 2 which is the Rx beam of the CSI-RS2. Interfaces received through respective Rx beams may be expressed as n1 and n2, respectively, and the UE may calculate final interference N by performing one of the following operations.

The UE may calculate the final interference by summing each interference (N=n1+n2).

The UE may calculate the final interference by calculating an average value of each interference (N=avg(n1, n2)).

The final interference may be calculated by a value acquired by multiplying each interference by a weight and adding a value acquired through the multiplication. Here, the eNB may designate a coefficient (e.g., a1 or a2) representing the weight to the UE (N=a1n1+a2n2).

One noise vector may be generated by concatenating each interference and calculated as the final interference (N=[n1$^T$ n2$^T$]$^T$).

<Case 1-5>

In addition to a situation in which a plurality of TPs performing the CoMP joint transmission and one UE operate, a situation in which at least one TP of the plurality of TPs provides a service to two or more UEs may be considered. Specifically, when the TP1 and the TP2 transmit data to UE A by the CoMP joint transmission and at least one TP of the TP1 or the TP2 provides a MU MIMO service to another UE B, a CSI calculation method of UE A is proposed.

In order to reflect interference from co-scheduled UE (e.g., UE B) to the SINR (or CQI), the UE (e.g., UE A) that calculates the CSI may receive a configuration of report setting in which NZP CSI-RS is additionally included in the IMR. In other words, in Case 1-1 to Case 1-3 described above, one NZP CSI-RS may be further added to the IMR. The UE may measure power for each port of the NZP CSI-RS and add the measured power to the existing measured interference. Which Rx beam the NZP CSI-RS is to be received through may be determined by the same method as which Rx beam the CSI-IM is to be received through.

As a specific example, the report setting of Case 1-1 described above will be described as an example. Table 13 shows an example of the report setting in which the NZP CSI-RS is added to the IMR in Table 10.

TABLE 13

| Report setting | CMR: CSI-RS1 for TP1, CSI-RS2 for TP2<br>IMR: CSI-IM(ZP CSI-RS), NZP CSI-RS (for MU-MIMO interference)<br>CSI feedback contents: RI1, PMI1, RI2, PMI2, CQI |
|---|---|

Equation 5 shows an equation in which the UE considers interference from the co-scheduled UE (e.g., UE B) when calculating the SINR (or CQI). Equation 5 is a form in which $I_{MU}$ corresponding to the interference of the co-scheduled UE (e.g., UE B) in Equation 3 is added. The $I_{MU}$ may be calculated through power measurement for each port of the NZP CSI-RS.

$$[H1 \ H2]\begin{bmatrix} PMI1 & 0 \\ 0 & PMI2 \end{bmatrix}\begin{bmatrix} x1 \\ x2 \end{bmatrix} + N + I_{MV} \qquad \text{[Equation 5]}$$

When calculating the CSI, the UE measures all of H1, H2, N, and $I_{MU}$ in Equation 8 from the Rx beam 1 to calculate the reception SINR of the data transmitted by the TP1, and then measures signal power from H1*PMI1*x1, interference power from the TP2 from H2*PMI2*x2, noise from N and interference power of the remaining cells, and interference of the co-scheduled UE (UE B) to calculate the SINR (or CQI).

When calculating the CSI, the UE measures all of H1, H2, N, and $I_{MU}$ in Equation 8 from the Rx beam 2 to calculate the reception SINR of the data transmitted by the TP2, and then measures signal power from H2*PMI2*x2, interference power from the TP1 from H1*PMI1*x1, the noise from N and the interference power of the remaining cells, and the interference of the co-scheduled UE (UE B) to calculate the SINR (or CQI).

As a result, the UE may measure the interference by assuming the following for the NZP CSI-RS. The NZP CSI-RS may assume the same QCL-type D (QCL for the spatial Rx parameter) as all CSI-RSs (e.g., both CSI-RS1 and CSI-RS2) given as the CMR. However, when calculating SINRi or CQIi that assumes the CSI-RSi through a desired channel, the QCL-Type D of the CSI-IM and the CSI-RSi may be assumed (here, i may correspond to the index of the eNB).

Method 2: Reporting CSI for Plurality of TPs Performing CoMP Operation

A UE supported by a plurality of TPs may measure CSI and report the CSI to at least one of the plurality of TPs. Hereinafter, a method for calculating, encoding, and reporting the CSI is proposed in order to report the CSI to the plurality of TPs which operates in CoMP.

For convenience of description, PUCCH CSI reporting is described with reference to an example, but this is just one example for helping understanding the present disclosure and does not limit the scope of the present disclosure. Therefore, as an example, this is applicable even to semi-persistent PUSCH CSI reporting, of course. Furthermore, the method is described by assuming that two TPs perform the CoMP operation. It is assumed that the number of the TP (e.g., TP index), and a reference signal transmitted from each TP, and the number of a CSI parameter for each TP correspond. For example, the number of the TP may be represented by CSI-RS1 transmitted by TP1, and CSI1 parameters (e.g., RI1, PMI1, and CQI1) for the TP1. However, the assumptions are just for convenience of the description and do not limit the scope of the present disclosure. Therefore, this is applicable even to a case of reporting the CSI to three or more TPs performing the CoMP operation.

When the UE reports subband (SB) CSI to the TP in the NR system, the CSI may be separately encoded divided into each of Part 1 CSI and Part 2 CSI (wideband (WB) CSI is constituted by a single part and all CSI contents are encoded at once). In the subband CSI, the part 1 CSI may be constituted only by contents in which a payload size is not changed and the part 2 CSI may be constituted by contents in which the payload size is variable.

Table 14 shows examples of CSI parameters of part 1 and part 2 constituting the subband CSI. Specifically, referring to Table 14, Part 1 may include (when reported) L1, (when reported) CRI, (when reported) NZBI, RI, and CQI of a first codeword. Part 2 may include PMI and when RI>4, Part 2 may include CQI of a second codeword.

TABLE 14

| Part 1 | (CRI)/(LI)/(NZBI)/RI/CQI for $1^{st}$ codeword |
|---|---|
| Part 2 | PMI/CQI for $2^{nd}$ codeword |

In the CSI reporting to the plurality of TPs supporting the CoMP operation, when the subband CSI is reported, a method for encoding the subband CSI separately into Part 1 and Part 2 may be considered. In this case, it is assumed that the CSI reporting methods to the plurality of TPs are configured to be the same as each other.

<Case 2-1>

In the case of reporting a different CQI for each TP, the payload sizes of all CQIs are fixed, so the CQI may be encoded into Part 1 and only PMI for each TP (e.g., PMI1 or PMI2) may be encoded into Part 2. For example, when each of the plurality of TPs performing the CoMP operation transmits one different codeword, the UE reports one CQI for each TP, and as a result, CQIs corresponding to the number of TPs should be able to be continuously reported as the part 1 CSI.

Table 15 illustrates an example of a CSI configuration according to the method proposed by the present disclosure.

TABLE 15

| Part 1 | (CRI)/(LI)/(NZBI)/RI1/RI2/CQI1/CQI2 |
|---|---|
| Part 2 | PMI1/PMI2 |

<Case 2-2>

When the UE may report RI=0, the CQI corresponding to RI=0 is not reported. That is, when one RI of RI1 and RI2 is 0, one CQI is reported and when all RIs are not 0, two CQIs are reported. Therefore, one of the CQIs may be encoded to be reported as part 1 and the other may be encoded to be reported as part 2.

Table 16 shows an example of a CSI configuration according to the encoding method proposed by the present disclosure. Referring to Table 16, CQI_A may be encoded into part 1 and CQI_B may be encoded into part 2. When one RI is 0, CQI_A means CQI corresponding to RI which is not 0 and CQI_B corresponds to RI which is 0, and as a result, CQI_B may be omitted (PMI corresponding to RI=0 may be omitted in Part 2). When neither of the RIs is 0, CQI_A and CQI_B may mean CQIs corresponding to RI1 and RI2, respectively.

TABLE 16

| Part 1 | (CRI)/(LI)/(NZBI)/RI1/RI2/CQI_A |
|---|---|
| Part 2 | PMI1/PMI2/CQI_B |

In the above method, even when only one RI is not 0, if the corresponding RI is greater than a specific value (e.g., 4), transmission of a second codeword is assumed, so the CQI needs to be transmitted for each codeword. Accordingly, CQI_A may correspond to a CQI for the first codeword, and CQI_B may correspond to a CQI for the second codeword. When the RI which is not 0 is smaller than the specific value (e.g., 4), only CQI_A may be transmitted and CQI_B may be omitted and not transmitted in Part 2.

<Case 2-3>

A CSI-RS for channel measurement is selected according to the value of the CRI, and when the CRI selects one specific CSI-RS, only CSI (e.g., RI/PMI/CQI) for the corresponding CSI-RS may be transmitted. When a plurality of CSI-RSs is selected, all CSIs (e.g., RI/PMI/CQI) for respective CSI-RSs may be transmitted (e.g., both RI1/PMI1/CQI1 and RI2/PMI2/CQI2). Therefore, RI_A and CQI_A (transmitted in any case regardless of the CRI) may be encoded into Part 1 by considering a possibility that the CRI will select one specific CSI-RS) and RI_B, CQI_B, PMI1, and PMI2 (of which transmission is determined according to the CRI or of which payload size is variable according to the value of Part 1) may be encoded to be transmitted through Part 2. Table 17 shows an example of a CSI configuration according to the method proposed by the present disclosure.

TABLE 17

| Part 1 | (CRI)/(LI)/(NZBI)/RI_A/CQI_A |
|---|---|
| Part 2 | RI_B/PMI1/PMI2/CQI_B |

For example, when the CSI-RS1 is selected based on the CRI, RI_A=RI1 and CQI_A=CQI1, and RI_B, PMI2, and CQI_B are not encoded and not transmitted. Even in this case, when the value of the RI1 is larger than the specific value (e.g., 4), transmission of the second codeword is assumed, so the CQI should be transmitted for each codeword. Accordingly, CQI_A may be encoded with the CQI for the first codeword and CQI_B may be encoded with the CQI for the second codeword.

Further, the encoding method proposed in Case 2-1 and Case 2-3 described above may be applied to both the subband CSI reporting and the wideband CSI reporting. For example, when the wideband CSI is encoded separately into Part 1 and Part 2, the aforementioned encoding method may be extensively applied.

Meanwhile, CSI reportings of different methods may be indicated to the plurality of TPs supporting the CoMP operation, respectively. For example, the wideband (subband) CSI reporting may be configured for the TP1 and the subband (wideband) CSI reporting may be configured for the TP2.

As an example, when wideband CSI feedback (i.e., CSI for measuring the channel by the CSI-RS1) is configured for the TP1 and subband CSI feedback (i.e., CSI for measuring the channel by the CSI-RS2) is configured for the TP2, the UE may disregard a wideband CSI feedback configuration for the TP1 and report the subband CSI. That is, the UE may be configured to preferentially follow a more sophisticated CSI feedback configuration. Alternatively, on the contrary, a wideband CSI having a smaller CSI payload size may be configured to be reported to the TP1. The UE may disregard the subband CSI feedback configuration for the TP2 and report the wideband CSI.

Alternatively, when the wideband CSI feedback (i.e., CSI for measuring the channel by the CSI-RS1) is configured for the TP1 and the subband CSI feedback (i.e., CSI for measuring the channel by the CSI-RS2) is configured for the TP2, the UE may report the wideband CSI (i.e., CSI for measuring the channel by the CSI-RS1) to the TP and report the subband CSI (i.e., CSI for measuring the channel by the CSI-RS1) to the TP2, according to each configuration. In this case, the CSI encoding method needs to be considered.

The UE may encode all wideband CSIs of the TP1 separately into Part 1 and encode the subband CSI of the TP2 separately into Part 1 and Part 2. In this case, since Part 1 of the TP1 ad Part 2 of the TP2 mean the same part, the CSI may be encoded as follows.

<Case 2-4>

When whether a single codeword is to be transmitted and whether a plurality of codewords is to be transmitted are determined according to all ranks (i.e., RI1+RI2) of the TP1 and the TP2, the CQI corresponding to the second codeword may exist or not exist. Therefore, CQI1 and PMI2 of the TP2 in which the subband CSI reporting is configured may be encoded as Part 2. Table 18 shows an example of a CSI configuration according to the method proposed by the present disclosure.

TABLE 18

| Part 1 | (CRI)/(LI)/(NZBI)/RI1/RI2/CQI1/PMI1 |
|---|---|
| Part 2 | PMI2/CQI2 |

<Case 2-5>

When one different CQI is reported for each TP regardless of all ranks, both CQIs are continuously transmitted, and as a result, both CQIs may be encoded into Part 1 and only PMI1 of the TP2 in which the subband CSI reporting is configured may be encoded into Part 2. Table 19 shows an example of a CSI configuration according to the method proposed by the present disclosure.

TABLE 19

| Part 1 | (CRI)/(LI)/(NZBI)/RI1/RI2/CQI1/PMI1/CQI2 |
|---|---|
| Part 2 | PMI2 |

Case 2-1 to Case 2-5 described above may be applied as the CSI encoding method in an environment in which whether to report the subband or wideband CSI may be independently configured for each CSI-RS resource in one CSI reporting setting (e.g., CSI reporting related configuration information). The UE may select and report which TP participates in the CoMP together with the CSI and in this case, the CSI is calculated by assuming that only a selected TP participates in CoMP transmission.

For example, when the report setting is configured as shown in Table 13 of Case 1-1 described above, the UE may select a non-CoMP transmission method in which only the TP1 transmits data by selecting the CSI-RS1 corresponding to the TP1 and or select a non-CoMP transmission method in which only the TP2 transmits data by selecting the CSI-RS2 corresponding to the TP2. Alternatively, the UE may select a CoMP transmission method in which the TP1 and the TP2 transmit data by selecting both the CSI-RS1 and the CSI-RS2. When the UE selects the non-CoMP transmission method in which only the TP1 transmits data by selecting the CSI-RS1 corresponding to the TP1, the UE may report the CSI according to the subband or wideband CSI reporting method corresponding to the CSI-RS1 and when selecting the CSI-RS2 corresponding to the TP2, the UE may report the CSI according to the subband or wideband CSI reporting corresponding to the CSI-RS2. When selecting both the CSI-RS1 and the CSI-RS2, the UE may encode and report the CSI according to the subband and/or wideband reporting method of Case 2-1 to Case 2-5 described above.

Case 2-1 to 2-5 described above may be applied to the CSI encoding method even in an environment in which a plurality of CSI reportings (i.e., report settings) may be configured to the UE and a configuration for whether to report the subband or wideband CSI is independently enabled for each report setting. For example, the UE may receive a configuration of report setting 1 and report setting 2 and both report settings are connected for CoMP CSI feedback as in Table 14 of Case 1-2 described above from the TP.

The UE may select a non-CoMP transmission method in which only the TP transmits data by selecting report setting 1 corresponding to the TP1 or select a non-CoMP transmission method in which only the TP2 transmits data by selecting report setting 2 corresponding to the TP2. Alternatively, the UE may select a CoMP transmission method which the TP1 and the TP2 transmit data by selecting both the report setting 1 and the report setting 2. The UE may report the CSI according to the subband or wideband CSI reporting method corresponding to the report setting 1 when selecting the report setting 1 and report the CSI according to the subband or wideband CSI reporting method corresponding to the report setting 2 when selecting the report setting 2. When selecting both the report settings, the UE may encode and report the CSI according to the subband and/or wideband reporting method of Case 2-1 to Case 2-5 described above.

Alternatively, when the CSI is periodically transmitted in response to the report setting, the CSI encoding method of the UE may be determined according to whether CSI reportings corresponding to both report settings collide with each other. When the CSI reportings for both TPs do not collide with each other, the CSI may be encoded and transmitted according to the subband or wideband CSI reporting method configured by the report setting of each TP (in this case, the UE may calculate and report non-CoMP CSI). When the CSI reportings for both TPs collide with each other, the UE may calculate and report the CoMP CSI and in this case, the CSI may be encoded and reported according to the subband and/or wideband reporting method of Case 2-1 to Case 2-5 described above.

When PMI1 and PMI2 are encoded with one port, and both PMIs are reported as wideband PMI and subband PMI, respectively, for an encoding order, PMI corresponding to a row CSI-RS index is first concatenated according to the index of the CSI-RS to generate a bitstream. That is, wideband PMI1, subband PMI1, wideband PMI2, and subband PMI2 may be concatenated to each other in sequence. As a result, stronger channel coding is applied to PMI corresponding to a row index of the CSI-RS, and as a result, the PMI may be reported in a high protection state. The order for the CQI may also be determined according to the row index of the CSI-RS by the same method as the PMI.

Alternatively, the bitstream may be generated by concatenating wideband PMI1, wideband PMI2, subband PMI1, and subband PMI2 in sequence by prioritizing wideband information. The order for the CQI may also be determined by the same method as the PMI.

When the CSI is report only to one TP (or TRP) through one PUCCH and the CSI is shared by the remaining TPs through backhaul connection, an additional delay may occur even in CSI sharing due to a backhaul delay between the TPs. In order to prevent the additional delay, it may be preferable to report the CSI through the PUCCH configured for each TP.

Table 20 shows an example in which report settings for both TPs similar to Case 1-1 described above is constituted by one report setting.

TABLE 20

| Report setting | CMR: CSI-RS1 for TP1, CSI-RS2 for TP2<br>IMR: CSI-IM(ZP CSI-RS or NZP CSI-RS)<br>CSI feedback contents: RI1, PMI1, RI2, PMI2, CQI1, CQI2, (CRI/LI/NZBI) |
|---|---|

Like the report settings of Case 1-1 and the report setting of Table 23, when report settings for a plurality of TPs(or TRPs and panels) are configured as one report setting, the UE may calculate the CSI for each TP and transmit the CSI through the PUCCH transmitted to each TP. As a specific example, the UE may calculate CSI1 (e.g., RI1/PMI1/CQI1) for the TP1 and CSI2 (e.g., RI2/PMI2/CQI2) for the TP2, transmit the CSI1 to the TP1 through PUCCH resource 1, and transmit the CSI2 to the TP2 through PUCCH resource 2.

When the UE encodes both the CSI1 for the TP1 and the CSI2 for the TP2 by using the methods of Case 2-1 to Case 2-5 described above, the UE may transmit the same encoded bits to PUCCH resource 1 and PUCCH resource 2. When the UE encodes each of the CSI1 and the CSI2, the UE may transmit the CSI1 (i.e., CSI in which the CSI-RS1 is calculated as the CMR) through the PUCCH1 and transmit the CSI2 (i.e., CSI in which the CSI-RS2 is calculated as the CMR) through the PUCCH2.

To this end, two PUCCH resources need to be configured in one report setting. That is, PUCCH resources which are as large as the number of TPs need to be configured in one report setting. The respective PUCCH resources may be configured with different periods and offsets. However, when transmission timings of the PUCCH1 and the PUCCH2 are significantly different from each other, the CSI of a PUCCH transmitted later is outdated and may be thus undesirable. Accordingly, there is a need of limiting the period and offset setting of both PUCCH resources.

For example, different offsets are set at the same period for both PUCCHs, but a difference of both offsets may be configured to be equal to or less than a specific P (the eNB may set P and indicate P to the UE or the UE may set P, and then indicate P to the eNB or use different fixed values according to subcarrier spacing (SCS)). Alternatively, the periods and offsets of both PUCCHs are continuously set to be equal to each other, and the PUCCH resources may be subjected to time division multiplexing (TDM) or frequency division multiplexing (FDM) in the same slot. Alternatively, it is possible to limit the periods of both PUCCHs to have a multiple relationship.

When the UE configures a CSI reference resource in a time domain for CSI calculation, the configures the CSI reference resource a time n−k that satisfies a valid condition based on a CSI reporting time n. When a method of applying this to the CSI reporting in a CoMP scenario is considered, if reporting times of both PUCCHs are different in the CSI reportings for both TPs, the time n−k is set to a CSI reference time by assuming a PUCCH which is transmitted early as a representative reporting time n and the CSI1 and the CSI2 are calculated to transmit the calculated CSI through each PUCCH. The valid condition should be able to be satisfied for both TPs. Even when the reporting times of both PUCCHs are the same as each other, the same method may be applied.

When the difference in transmission time between both PUCCHs is smaller than the specific value P, the UE may perform the operation and otherwise, the UE may configure the CSI reference resource for each CSI reporting PUCCH in the same as the existing method, and calculate the CSI and report the calculated CSI through each PUCCH by the aforementioned methods.

FIG. 18 illustrates one example of an operation flowchart in which a UE supported by a plurality of base stations reports channels State information to which a method proposed by the present disclosure may be applied. FIG. 18 is just for convenience of the description and does not limit the scope of the present disclosure.

Referring to FIG. 18, it is assumed that the UE and/or the base station operate(s) based the methods and/or embodiments of Methods 1 to 2 described above. Further, it is assumed that a beam (or panel) for each base station is independent. Some of steps described in FIG. 18 may be merged or omitted. Furthermore, in performing procedures described below, the CSI related operation may be considered/applied.

A UE may receive CSI report-related configuration information (e.g., report setting) from at least one base station among a plurality of base stations (S1810). The plurality of base station may support a CoMP operation. In particular, the plurality of base station may perform CoMP joint transmission.

For example, the CSI report-related configuration information may be based on Method 1 described above. The CSI report-related configuration information may include channel measurement resource information, interference measurement resource information, and information on a CSI parameter(s) to be reported. Further, the CSI report-related configuration information may further include an uplink resource configuration for CSI reporting.

As a specific example, the CSI report-related configuration information may be constituted by one CSI report-related configuration information in common for the plurality of base stations. This may correspond to Case 1-1 of Method 1 described above.

As another example, each CSI report-related configuration information may be configured for each base station of the plurality of base station. This may correspond to Case 1-2 or Case 1-3 of Method 1 described above. In this case, interference measurement resource information of a specific base station (e.g., first base station) may include a reference signal (or channel measurement resource) (e.g., CSI-RS or second reference signal) for channel measurement transmitted by base station except for the specific base station among the plurality of base station. Furthermore, each base station of the plurality of base stations may transmit CSI report-related configuration information thereof to the UE.

When the CSI report-related configuration information is configured for each base station of the plurality of base stations, the UE may receive linkage relationship information for the CSI report-related configuration information configured for each base station from at least one base station among the plurality of base stations. The linkage relationship information may indicate that respective CSI report-related configuration information is linked to each other for CoMP CSI calculation. The linkage relationship information may be transmitted to the UE through explicit signaling. Alternatively, the linkage relationship information may be transmitted to the UE by an implicit method. As an example, when an uplink resource (e.g., PUCCH resource) for CSI reporting defined in each CSI report-related configuration information, a transmission period (e.g., PUCCH transmission period) of the CSI reporting, and a transmission offset are identical, the UE may determine that the respective CSI report-related configuration information is linked to each other for CoMP CSI calculation. Alternatively, when time and frequency resources corresponding to (semi-persistent or aperiodic) PUSCH overlap, the UE may determine that the respective CSI report-related configuration information is linked to each other for CoMP CSI calculation.

As another example, when at least one base station (e.g., first base station) of the plurality of base station co-schedules two or more UEs, the interference measurement resource information may further include Non Zero Power (NZP) Channel State Information-Reference Signal (CSI-RS) related information in order to reflect interference of a co-scheduled UE to the CSI calculation. This may correspond to Case 1-5 of Method 1 described above. In this case, the UE may calculate the CSI by considering the interference from the co-scheduled UE.

In relation to the uplink resource configuration for the CSI reporting, uplink resources (e.g., PUCCH resources) corresponding to the number of plurality of base stations may be allocated for the CSI reporting to the plurality of base stations. Uplink resources (e.g., PUCCH resources) corresponding to respective base stations may be set to different periods and offsets. Alternatively, the respective uplink resources (e.g., PUCCH resources) may be configured with different offsets at the same period and a difference between both random offsets may be configured to be equal to or less than a specific value P. Here, the specific value P may be determined by one method of i) setting P and indicating the P to the UE by the base station, ii) setting the P and then indicating the P to the base station, and iii) using different fixed values according to the subcarrier spacing. Alternatively, periods and offsets of all uplink resources (e.g., PUCCH resources) may be continuously set to be equal and configured to be subjected to TDM or FDM at the same slot between the uplink resources (e.g., PUCCH resources). Alternatively, the period of each uplink resource (e.g., PUCCH resource) may be set to have a multiple relationship.

The UE may receive a reference signal (RS) from the base station (S1820). That is, the UE may receive reference signals (e.g., first reference signal and second reference signal) from a plurality of base stations, respectively. The UE may receive the reference signal through a reception beam corresponding to each base station. The reference signal may be transmitted from the base station periodically or aperiodically. The reference signal (e.g., the first reference signal or the second reference signal) may include a reference signal for channel measurement and a reference signal for interference measurement. As a specific example, the reference signal may include CSI-RS for channel measurement and CSI-IM for interference measurement.

The UE may calculate CSI by performing measurement for the received reference signal (S1830). For example, the CSI calculation may be performed based on Method 1 described above. The UE may calculate RI and PMI for the channel of the channel measurement reference signal (e.g., CSI-RS) for each base station based on the CSI report-related configuration information and the reference signal. By applying the calculated RI and PMI, the UE may calculate the CQI achievable when all base stations performing the CoMP joint transmission simultaneously transmit data. Here, the UE may assume that (analog) Rx beams (or Rx panels) in which data are received from respective base stations are different from each other.

As a specific example, when the plurality of base stations supporting the CoMP joint transmission transmits independent layers, respectively, the UE may receive a data signal, an interference signal, noise, etc., through the reception beam for a first base station in order to calculate the CSI (e.g., SINR or CQI) for the first base station. The UE may measure signal power by receiving the reference signal (e.g., CSI-RS) for channel measurement through the reception (Rx) beam for the first base station. Further, the UE may estimate noise and interference from another cell which does not participate in CoMP by receiving the reference signal (e.g., CSI-IM) for interference measurement through the reception beam (e.g., the reception beam for the first base station) through which the reference signal (e.g., CSI-RS) for channel measurement is received. Furthermore, the UE may estimate the inter layer interference by receiving the reference signal for channel measurement transmitted by other base stations (e.g., base stations except for the first base station among the plurality of base stations) through the reception beam (e.g., the reception beam for the first base station) through which the reference signal for channel measurement is received. In this case, the RI and the PMI for the reference signal of each base station are applied to the reference signals transmitted by the base stations except for the first base station to measure the inter layer interference power. Furthermore, the UE may measure interference of another co-scheduled UE through the reception beam. Based thereon, the UE may calculate the reception SINR (or CQI) of data transmitted by the first base station.

Consequently, the reference signal (e.g., a first reference signal) transmitted by the first base station and the reference signals (e.g., second reference signals) transmitted by the base stations except for the first base station among the plurality of base stations may have a Quasi co-location (QCL) relationship (QCL-Type D) for the spatial Rx parameter (i.e., it may be assumed that the reference signal for channel measurement transmitted by the base stations except for the first base station among the plurality of base stations disregards an original QCL-Type D attribute thereof and follows the QCL-Type D for the reference signal for channel measurement transmitted by the first base station).

Furthermore, the reference signal (e.g., the first reference signal) transmitted by the first base station and the interference measurement resource (e.g., CSI-IM) included in the interference measurement resource information may have the Quasi co-location (QCL) relationship (QCL-Type D) for the spatial Rx parameter.

As another example, a method for calculating the CSI by the UE receiving the common layer from the plurality of the base stations may be based on Case 1-4 of Method 1 described above. When receiving the common layer from the plurality of base stations performing the CoMP joint transmission, the UE may assume that the reference signal (CSI-IM) for interference measurement may have the Quasi co-location (QCL) relationship (QCL-Type D) for the same spatial Rx parameter with all reference signals (CSI-RSs) for channel measurement of the respective base stations performing the CoMP joint transmission. That is, the UE may receive the reference signal (e.g., CSI-RS) for channel measurement and the reference signal (CSI-IM) for interference measurement through the reception beam of the first base station and at the same time, may receive the CSI-RS and the CSI-IM even through the reception beam of another base station.

In this case, the UE may calculate total interference based on interference (e.g., first interference) received through the reception beam to the first base station and interference (e.g., second interference) received through the reception beams for the base stations except for the first base station among the plurality of base stations. The total interference may be calculated as one of i) a sum value of interference for each base station (e.g., a sum value of the first interference and the second interference), ii) an average value of interference for each base station (e.g., an average value of the first interference and the second interference), iii) a sum value acquired by multiplying the interference for each base station by a weight (e.g., a value acquired by multiplying each of the first and second interferences by the weight and summing the values acquired through the multiplication) (the base station may configured the weight to the UE), and iv) one noise vector value concatenating each interference.

Furthermore, the plurality of base stations may apply one common PMI in the case of coherent joint transmission.

As another example, when at least one base station of the plurality of base stations provides the service to two or more UEs, the UE may calculate the CSI based on Case 1-5 of Method 1 described above. The UE may measure power for each port of the NZP CSI-RS and add the measured power to the existing measured interference. Which Rx beam the NZP CSI-RS is to be received through may be determined by the same method as which Rx beam the CSI-IM is to be received through.

Consequently, the UE may assume that the NZP CSI-RS has the same QCL-Type D (QCL for the spatial Rx parameter) as all reference signals (e.g., CSI-RSs) for channel measurement. When calculating the CSI for the first base station, the UE may determine that the reference signal (e.g., CSI-RS) for channel measurement transmitted by the first base station and the NZP CSI-RS have the QCL-Type D relationship.

The UE may encode the calculated CSI and transmit the encoded CSI to at least one of the plurality of base stations (S1840). The CSI may be transmitted through PUCCH or semi-persistent PUSCH. The CSI may include Channel Quality Information (CQI), and the CQI may correspond to a value calculated when the UE simultaneously receives the layers from the plurality of base stations. The UE may encode the CSI in order to transmit the CSI to the base station. For example, the method for encoding the CSI may be based on Method 2 described above.

As an example, the same type of CSI reporting (e.g., wideband CSI report or subband CSI reporting) may be configured for the plurality of base station. When the subband CSI reporting is configured for the plurality of base station supporting the CoMP operation, encoding may be separately performed into Part 1 and Part 2. The encoding may be based on Case 2-1 and Case 2-3 of Method 2 described above.

As a specific example, all CQIs for each base station may be encoded into Part 1, and all PMIs for each base station may be encoded into Part 2. In this case, since one CQI is reported for each base station, CQIs corresponding to the number of base stations may be continuously encoded into Part 1 CSI.

As another example, under the assumption that the PMI is encoded into Part 2, when the RI values for the plurality of base stations include 0, CQI when the RI is not 0 may be encoded into Part 1 and CQI when the RI is 0 may be encoded into Part 2. When the RI is 0, the CQI may be omitted in Part 2. However, if there is no value including 0 among the RI values for the plurality of base stations, the CQI may be encoded into each of Part 1 and Part 2 corresponding to the index of each base station. Furthermore, in the above method, even when only one RI is not 0, if the corresponding RI is greater than a specific value (e.g., 4), transmission of a second codeword is assumed, so the CQI needs to be transmitted for each codeword. Therefore, the CQI for the first codeword may be encoded into Part 1 and the CQI for the second codeword may be encoded into Part 2. When the RI which is not 0 is smaller than the specific value (e.g., 4), CQI may be encoded only into Part 1 and omitted in Part 2.

As another example, in Part 1, the RI and the CQI (transmitted in any case regardless of the CRI) are encoded, and the RI, the CQI, and the PMI (of which transmission or not is determined or of which payload size is variable according to the value of Part 1) may be encoded into Part 2. Even in this case, when the value of the RI1 is larger than the specific value (e.g., 4), transmission of the second codeword is assumed, so the CQI should be transmitted for each codeword. Therefore, the CQI for the first codeword may be encoded into Part 1 and the CQI for the second codeword may be encoded into Part 2.

Meanwhile, CSI reportings of different methods may be indicated to the plurality of base stations supporting the CoMP operation, respectively. For example, the wideband (subband) CSI feedback may be configured for some of the plurality of base stations and the subband (wideband) CSI feedback may be configured for the remaining base stations. In this case, the UE may disregard the wideband CSI feedback and transmit the subband CSI feedback by prioritizing a more sophisticated CSI feedback configuration. Alternatively, on the contrary, a wideband CSI feedback having a smaller CSI payload size may be configured to be transmitted. Alternatively, the CSI may be encoded and transmitted according to each indicated CSI reporting method.

For example, it is assumed that the wideband CSI reporting is configured for one base station and the subband CSI reporting is configured for other base stations. In this case, all wideband CSI reportings may be encoded into Part 1 and the subband CSI reportings may be encoded separately into Part 1 and Part 2. In this case, for Part of each base station, when whether a single codeword is to be transmitted and whether a plurality of codewords is to be transmitted are determined according to all ranks of the plurality of base stations, the CQI corresponding to the second codeword may be encoded into Part 2. Alternatively, when one different CQI is reported for each base station regardless of all ranks, the CQI may be encoded into Part 1 and the PMI may be encoded into Part 2.

Meanwhile, the UE may select and report which base stations participate in CoMP together with the CSI. In this case, the CSI may be calculated by assuming that only selected base stations participate in CoMP transmission.

For example, when the CSI reporting for the plurality of base stations is configured to one report setting, the UE may select a non-CoMP transmission method in which only one base station transmits data by selecting only one channel. Alternatively, the UE may select a CoMP transmission method in which the plurality of base stations transmits data by selecting a plurality of channels. When the UE selects the non-CoMP transmission method, the UE may report the CSI according to the subband and/or wideband CSI reporting corresponding to each CSI-RS.

As another example, when the CSI report settings for the plurality of base stations are configured, respectively, it may be indicated that each report setting is linked for CoMP CSI feedback. The UE may select the non-CoMP transmission method by selecting only one of the plurality of report settings. Alternatively, the UE may select the CoMP transmission method by selecting all of the plurality of report settings. When the UE selects the non-CoMP transmission method, the UE may report the CSI according to the subband and/or wideband CSI reporting indicated in the corresponding report setting.

As another example, when the CSI is periodically transmitted in response to the report setting, the CSI encoding method of the UE may be determined according to whether CSI reportings corresponding to both report settings collide with each other. When the CSI reportings for both base stations do not collide with each other, the CSI may be encoded and transmitted according to the subband or wideband CSI reporting method configured by the report setting of each base station (in this case, the UE may calculate and report non-CoMP CSI). On the contrary, when the CSI reportings for both base stations collide with each other, the UE may calculate and report CoMP CSI.

PMI and/or CQI for the plurality of base stations are/is encoded with one port and the wideband PMI and/or CQI and the subband PMI and/or CQI are all reported, the PMI and/CQI may be encoded into the bitstream according to a row index order of the CSI-RS. As a result, stronger channel coding may be applied to PMI and/or CQI corresponding to a CSI-RS row index. Alternatively, the wideband PMI and/or CQI may be encoded earlier than the subband PMI and/or CQI by prioritizing the wideband CSI.

FIG. 19 illustrates an example of an operation flowchart of an base station receiving channel state information of a UE supported by a plurality of base stations to which a method proposed by the present disclosure may be applied. FIG. 19 is just for convenience of the description and does not limit the scope of the present disclosure.

Referring to FIG. 19, it is assumed that the UE and/or the BS operate(s) based the methods and/or embodiments of Methods 1 to 2 described above. Further, it is assumed that a beam (or panel) for each base station is independent. Some of steps described in FIG. 19 may be merged or omitted. Furthermore, in performing procedures described below, the CSI related operation may be considered/applied.

At least one base station of a plurality of base stations may transmit CSI report-related configuration information (e.g., report setting) to a UE (S1910). The plurality of base stations may support a CoMP operation. In particular, the plurality of base stations may perform CoMP joint transmission.

For example, the CSI report-related configuration information may be based on Method 1 described above. The CSI report-related configuration information may include channel measurement resource information, interference measurement resource information, and information on a CSI parameter(s) (contents) to be reported. Further, the CSI report-related configuration information may further include an uplink resource configuration for CSI reporting.

As a specific example, one common CSI report-related configuration information may be configured to the plurality of base stations. This may correspond to Case 1-1 of Method 1 described above.

As another example, each CSI report-related configuration information may be configured for each base station of the plurality of base stations. This may correspond to Case 1-2 or Case 1-3 of Method 1 described above. In this case, interference measurement resource information of a specific base station (e.g., first base station) may include a reference signal (or channel measurement resource) (e.g., CSI-RS) for channel measurement transmitted by base stations except for the specific base station among the plurality of base stations. Furthermore, each base station of the plurality of base stations may transmit CSI report-related configuration information thereof to the UE.

When the CSI report-related configuration information is configured for each base station of the plurality of base stations, at least one base station of the plurality of base stations may further transmit linkage relationship information for the CSI report-related configuration information configured for the UE for CoMP CSI calculation. The linkage relationship information may be transmitted to the UE through explicit signaling. Alternatively, the linkage relationship information may be transmitted to the UE by an implicit method. As an example, when an uplink resource (e.g., PUCCH resource) for CSI reporting defined in each CSI report-related configuration information, a transmission period (e.g., PUCCH transmission period) of the CSI reporting, and a transmission offset are set to be identical, the UE may determine that the respective CSI report-related configuration information is linked to each other for CoMP CSI calculation. Alternatively, when time and frequency resources corresponding to (semi-persistent or aperiodic) PUSCH are configured to overlap, the UE may determine that the respective CSI report-related configuration information is linked to each other for CoMP CSI calculation.

As another example, when at least base station (e.g., the first base station) of the plurality of base stations co-schedules two or more UEs, NZP CSI-RS related information may be further included in the interference measurement information by considering the interference in the co-scheduled UE.

In relation to the uplink resource configuration for the CSI reporting, uplink resources (e.g., PUCCH resources) corresponding to the number of plurality of base stations may be allocated. Uplink resources (e.g., PUCCH resources) corresponding to respective base stations may be set to different periods and offsets. Alternatively, the respective uplink resources (e.g., PUCCH resources) may be configured with different offsets at the same period and a difference between both random offsets may be configured to be equal to or less than a specific value P. Here, the specific value P may be determined by one method of i) setting P and indicating the P to the UE by the base station, ii) setting the P and then indicating the P to the base station, and iii) using different fixed values according to the subcarrier spacing. Alternatively, periods and offsets of all uplink resources (e.g., PUCCH resources) may be continuously set to be equal and configured to be subjected to TDM or FDM at the same slot between the uplink resources (e.g., PUCCH resources). Alternatively, the period of each uplink resource (e.g., PUCCH resource) may be set to have a multiple relationship.

Each of the plurality of base stations may transmit a reference signal (RS) from the UE (S1920). Each base station may transmit the reference signal periodically or aperiodically. The reference signal (e.g., the first reference signal or the second reference signal) may include CSI-RS for channel measurement and CSI-IM for interference measurement.

When each of the base stations performing the CoMP joint transmission transmits the common layer, the UE may assume that the reference signal (CSI-IM) for interference measurement may have the Quasi co-location (QCL) relationship (QCL-Type D) for the same spatial Rx parameter with all reference signals (e.g., CSI-RSs) for channel measurement of the respective base stations performing the CoMP joint transmission.

At least one base station of the plurality of base stations may receive the CSI from the UE (S1930). For example, the CSI may be calculated based on Method 1 described above and the CSI may be encoded based on Method 2 described above. CSI calculation may correspond to step S1830 of FIG. 18 and a CSI encoding process may correspond to step S1840 of FIG. 18. Hereinafter, a duplicated description will be omitted.

The base station may receive the CSI through PUCCH or semi-persistent PUSCH. The CSI may include Channel Quality Information (CQI), and the CQI may correspond to a value calculated when the UE simultaneously receives the layers from the plurality of base stations.

The CSI may be reported only to one base station of the plurality of base stations and the CSI may be shared by the remaining base stations through backhaul connection. Alternatively, in order to prevent CSI sharing delay due to backhaul delay between base stations, the CSI may be reported through the uplink resource (e.g., PUCCH) configured for each base station of the plurality of base stations. When the CSI for each base station is together encoded, the same encoded bits may be commonly received in each PUCCH resource. When the CSI is encoded for each base station, the CSI may be transmitted through each PUCCH resource.

Further, the base station may receive information on base stations which participate in CoMP from the UE together with the CSI. For example, the UE may select a non-CoMP transmission method by selecting one channel or one report setting and report the CIS for the corresponding base station. Alternatively, the UE may select base stations performing CoMP transmission by selecting a plurality of channels or a plurality of report settings, and the base station may receive the corresponding CSI.

Through the aforementioned methods and embodiments, CSI for the plurality of base stations which operates in CoMP may be measured and reported. Further, in the aforementioned methods and embodiments, the UE and/or the base station which operate according to each of the steps of FIGS. 18 to 19 may be specifically implemented by devices of FIGS. 20 to 24 to be described below.

Overview of Devices to which Present Disclosure is Applicable

FIG. 20 illustrates an example of block diagram of a wireless communication device to which a method proposed in the present disclosure may be applied.

Referring to FIG. 20, a wireless communication system may include a first device 2010 and a second device 2020.

The first device 2010 may be a base station, a network node, a transmitting terminal, a receiving terminal, a transmitting device, a receiving device, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device 2020 may be a base station, a network node, a transmitting terminal, a receiving terminal, a transmitting device, a receiving device, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 2010 may include at least one processor, such as a processor 2011, at least one memory, such as a memory 2012, and at least one transceiver, such as a transceiver 2013. The processor 2011 may perform the functions, procedures, and/or methods described above. The processor 2011 may perform one or more protocols. The processor 2011 may perform one or more layers of a radio interface protocol. The memory 2012 may be connected to the processor 2011 and store various types of information and/or commands. The transceiver 2013 may be connected to the processor 2011 and controlled to transmit/receive a radio signal.

As a specific example, the processor 2011 may transmit CSI report-related configuration information to a second device 2020 by controlling the transceiver 2013 (S1910). Furthermore, the processor 2011 may transmit a reference signal to the second device 2020 by controlling the transceiver 2013 (S1920). Furthermore, the processor 2011 may receive CSI from the second device 2020 by controlling the transceiver 2013 (S1930).

The second device 2020 may include at least one processor, such as a processor 2021, at least one memory, such as a memory 2022, and at least one transceiver, such as a transceiver 2023. The processor 2021 may perform the functions, procedures, and/or methods described above. The processor 2021 may implement one or more protocols. For example, the processor 2021 may implement one or more layers of the radio interface protocol. The memory 2022 may be connected to the processor 2021 and store various types of information and/or commands. The transceiver 2023 may be connected to the processor 2021 and controlled to transmit/receive a radio signal.

As a specific example, the processor 2021 may receive CSI report-related configuration information to a first device 2010 by controlling the transceiver 2023 (S1810). Furthermore, the processor 2021 may transmit a reference signal to the first device 2010 by controlling the transceiver 2023 (S1820). Furthermore, the processor 2021 may calculate CSI by performing measurement for the reference signal (S1830). Furthermore, the processor 2021 may encode the CSI, and transmit the CSI to the first device 2010 by controlling the transceiver 2010 (S1840).

FIG. 21 illustrates another example of the block diagram of the wireless communication device to which a method proposed in the present disclosure may be applied.

Referring to FIG. 21, a wireless communication system includes an eNB 2110 and multiple user equipments 2120 positioned within an area of the eNB. The eNB may be represented by a transmitting apparatus and the UE may be represented by a receiving apparatus, or vice versa. The eNB and the UE include processors(2111,2121), memories(2114, 2124), one or more Tx/Rx radio frequency (RF) modules (2115,2125), Tx processors(2112,2122), Rx processors (2113, 2123) and antennas(2116, 2126). The processor implements a function, a process, and/or a method which are described above. More specifically, a higher layer packet from a core network is provided to the processor 2111 in DL (communication from the eNB to the UE). The processor implements a function of an L2 layer. In the DL, the processor provides multiplexing between a logical channel and a transmission channel and allocation of radio resources to the UE 2120, and takes charge of signaling to the UE. The transmit (TX) processor 2112 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 2116 via individual Tx/Rx modules (or transceivers, 2115). Each Tx/Rx module may modulate an RF carrier into each spatial stream for transmission. In the UE, each Tx/Rx module (or transceiver, 2125) receives a signal through each antenna 2126 of each Tx/Rx module. Each Tx/Rx module reconstructs information modulated with the RF carrier and provides the reconstructed information to the receive (RX) processor 2123. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 2121.

UL (communication from the UE to the eNB) is processed by the eNB 2110 in a scheme similar to a scheme described in association with a receiver function in the UE 2120. Each Tx/Rx module 2125 receives the signal through each antenna 2126. Each Tx/Rx module provides the RF carrier and information to the RX processor 2123. The processor 2121 may be associated with the memory 2124 storing a program code and data. The memory may be referred to as a computer readable medium.

FIG. 22 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 22, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 23 illustrates an AI server 200 according to an embodiment of the present disclosure.

Referring to FIG. 23, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 24 illustrates an AI system 1 according to an embodiment of the present disclosure.

Referring to FIG. 24, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 24 may be considered to be detailed embodiments of the AI device 100 shown in FIG. 22.

<AI and Robot to which the Methods Proposed in this Disclosure May be Applied>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI and Self-Driving to which the Methods Proposed in this Disclosure May be Applied>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

<AI and XR to which the Methods Proposed in this Disclosure May be Applied>

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI, Robot and Self-Driving to which the Methods Proposed in this Disclosure May be Applied>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI, Robot and XR to which the Methods Proposed in this Disclosure May be Applied>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI, Self-Driving and XR to which the Methods Proposed in this Disclosure May be Applied>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for transmitting channel state information in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for reporting, by a user equipment (UE), channel state information (CSI) in wireless communication system, the method comprising:
receiving configuration information related to a CSI report,
wherein the configuration information includes (i) first resource information for a channel measurement and (ii) second resource information for an interference measurement, and
wherein a first resource for the channel measurement is configured based on the first resource information and a second resource for the interference measurement is configured based on the second resource information;
receiving a reference signal based on the configuration information;
measuring a signal to interference noise ratio (SINR) based on the reference signal,
wherein the SINR is measured by applying Quasi co location (QCL) information configured to the first resource to the second resource; and
transmitting the CSI including the SINR,
wherein the second resource is a channel state information-interference measurement (CSI-IM) resource, and
wherein the QCL information corresponds to QCL type D.

2. The method of claim 1, wherein measuring the SINR based on the reference signal comprises:
measuring a channel based on the first resource; and
measuring an interference based on the second resource,
wherein the interference is measured by applying the QCL information configured to the first resource to the second resource.

3. The method of claim 1,
wherein the configuration information further includes an uplink resource configuration for transmitting the CSI, and
wherein a plurality of uplink channel resources is configured based on the uplink resource configuration.

4. The method of claim 1,
wherein the UE is supported by a first base station and a second base station,
wherein the configuration information is configured separately for each base station.

5. The method of claim 4,
wherein resource information for interference measurement of first configuration information related to the CSI report for the first base station includes resource information for channel measurement of second configuration information related to the CSI report for the second base station.

6. The method of claim 5, further comprising:
receiving linkage relationship information between (i) the first configuration information for the first base station and (ii) the second configuration information for the second base station.

7. The method of claim 4,
wherein based on a common layer being received from the first base station and the second base station, a total interference is calculated based on a first interference received via reception beam associated with the first base station and a second interference received via reception beam associated with the second base station, and
wherein the total interference is calculated by one of i) a sum value of the first interference and the second interference, ii) an average value of the first interference and the second interference or iii) a value obtained by sum of the first interference and the second interference after multiplying each by a weight.

8. The method of claim 4,
wherein the CSI includes channel quality information (CQI), and
wherein the CQI corresponds to a value calculated when a layer is simultaneously received from the first base station and the second base station.

9. The method of claim 4,
wherein based on the CSI corresponding to a subband CSI report, the CSI is encoded by being divided into a part 1 and a part 2, and
wherein the part 2 comprises only a precoding matrix indicator (PMI) for each of the first base station and the second base station.

10. The method of claim 1,
wherein the CSI is calculated based on an interference from other UEs.

11. A user equipment (UE) configured to report channel state information (CSI) in a wireless communication system, the UE comprising:
at least one transceiver;
at least one processor; and
at least one computer memory connected to the at least one processor and storing instructions that, based on being executed by the at least one processor, perform operations comprising:
receiving configuration information related to a CSI report,
wherein the configuration information includes (i) first resource information for a channel measurement and (ii) second resource information for an interference measurement, and
wherein a first resource for the channel measurement is configured based on the first resource information and a second resource for the interference measurement is configured based on the second resource information;
receiving a reference signal based on the configuration information;
measuring a signal to interference noise ratio (SINR) based on the reference signal,
wherein the SINR is measured by applying Quasi co location (QCL) information configured to the first resource to the second resource; and
transmitting the CSI including the SINR,
wherein the second resource is a channel state information-interference measurement (CSI-IM) resource, and
wherein the QCL information corresponds to QCL type D.

12. The UE of claim 11, wherein measuring the SINR based on the reference signal comprises:
measuring a channel based on the first resource; and
measuring an interference based on the second resource, wherein the interference is measured by applying the QCL information configured to the first resource to the second resource.

13. A method for receiving, by a base station (BS), channel state information (CSI) in wireless communication system, the method comprising:
transmitting, to a user equipment (UE), configuration information related to a CSI report,
wherein the configuration information includes (i) first resource information for a channel measurement and (ii) second resource information for an interference measurement, and
wherein a first resource for the channel measurement is configured based on the first resource information and a second resource for the interference measurement is configured based on the second resource information;
transmitting, to the UE, a reference signal based on the configuration information; and
receiving, from the UE, the CSI including a signal to interference noise ratio (SINR),
wherein the SINR is calculated by applying Quasi co location (QCL) information configured to the first resource to the second resource,
wherein the second resource is a channel state information-interference measurement (CSI-IM) resource, and
wherein the QCL information corresponds to QCL type D.

14. The method of claim 1, wherein, based on the first resource being based on a plurality of first resources:
for each of the plurality of first resources, a same QCL information is configured based on QCL type D,
the SINR is measured by applying the same QCL information to the second resource.

15. The UE of claim 11, wherein, based on the first resource being based on a plurality of first resources:
for each of the plurality of first resources, a same QCL information is configured based on QCL type D,
the SINR is measured by applying the same QCL information to the second resource.

16. The BS of claim 13, wherein, based on the first resource being based on a plurality of first resources:
for each of the plurality of first resources, a same QCL information is configured based on QCL type D,
the SINR is calculated by applying the same QCL information to the second resource.

* * * * *